United States Patent
Tretiakov et al.

(10) Patent No.: US 10,834,366 B1
(45) Date of Patent: Nov. 10, 2020

(54) AUDIO/VIDEO RECORDING AND COMMUNICATION DOORBELL DEVICES WITH POWER CONTROL CIRCUITRY

(71) Applicant: Amazon Technologies, Inc., Seattle, WA (US)

(72) Inventors: Daniil Tretiakov, Kyiv (UA); James Steven Skeoch, Palos Verdes Estates, CA (US); Robert Tso, Playa Vista, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/212,274

(22) Filed: Dec. 6, 2018

(51) Int. Cl.
| | |
|---|---|
| H04N 7/18 | (2006.01) |
| H02M 1/08 | (2006.01) |
| H02M 7/44 | (2006.01) |
| G08B 3/10 | (2006.01) |
| G08B 15/00 | (2006.01) |
| H02M 7/06 | (2006.01) |
| H02M 1/00 | (2006.01) |

(52) U.S. Cl.
CPC ............. *H04N 7/186* (2013.01); *G08B 3/10* (2013.01); *H02M 1/08* (2013.01); *H02M 7/44* (2013.01); *G08B 15/00* (2013.01); *H02M 7/06* (2013.01); *H02M 2001/0009* (2013.01)

(58) Field of Classification Search
CPC .. H02M 1/08; H02M 7/44; H02M 2001/0009; H02M 7/06; G08B 3/10; G08B 15/00
See application file for complete search history.

(56) References Cited

U.S. PATENT DOCUMENTS

| | | |
|---|---|---|
| 7,193,644 B2 | 3/2007 | Carter |
| 8,139,098 B2 | 3/2012 | Carter |
| 8,144,183 B2 | 3/2012 | Carter |
| 8,154,581 B2 | 4/2012 | Carter |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |

(Continued)

*Primary Examiner* — Tracy Y. Li
(74) *Attorney, Agent, or Firm* — Lee & Hayes, P.C.

(57) ABSTRACT

In implementations described herein, power is supplied to functional components of audio/video (A/V) recording and communication doorbell devices ("A/V doorbells") during activation of signaling devices that are coupled to the A/V doorbells without the use of a backup power supply. To illustrate, systems described herein may include first parallel circuitry coupled to the signaling device and second parallel circuitry coupled to an A/V doorbell. The first parallel circuitry and the second parallel circuitry are configured to supply sufficient power to the functional components of the A/V doorbell during activation of the signaling device. In particular implementations, the first parallel circuitry and the second parallel circuitry include shunting circuitry to control the flow of current through the first and second parallel circuitry and supply sufficient power to both the signaling device and the A/V doorbell.

20 Claims, 15 Drawing Sheets

(56) References Cited

U.S. PATENT DOCUMENTS

| | | |
|---|---|---|
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 10,560,149 B1 * | 2/2020 | Skeoch .................... H04B 3/54 |
| 2015/0036389 A1 * | 2/2015 | Freeman ................. H02M 1/10 363/16 |
| 2017/0221319 A1 * | 8/2017 | Chen ......................... H02J 3/12 |
| 2019/0154439 A1 * | 5/2019 | Binder ................... G01B 11/26 |

* cited by examiner

A/V Recording And Communication Device 210

- Button 306
- Processor(s) 310
- Communication Module 312
- Camera 314
- Motion Sensor(s) 326
- Microphone(s) 328
- Speaker(s) 330
- Power Control Circuitry 124

Memory 402

- Device Application 404
- Image Data 406
- Audio Data 408
- Input Data 410
- Motion Data 412
- Text Data 414
- Message 416
- Output Signal 418

AUDIO/VIDEO RECORDING AND COMMUNICATION DOORBELL DEVICES WITH POWER CONTROL CIRCUITRY

BACKGROUND

Home security is a concern for many homeowners and renters. Those seeking to protect or monitor their homes often wish to have video and audio communications with visitors, for example, those visiting an external door or entryway. Audio/video (A/V) recording and communication doorbell devices provide this functionality, and can also aid in crime detection and prevention. For example, audio and/or video captured by an A/V recording and communication doorbell device can be uploaded to the cloud and recorded on a remote server. Subsequent review of the A/V footage can aid law enforcement in capturing perpetrators of home burglaries and other crimes. Further, the presence of one or more A/V recording and communication doorbell devices on the exterior of a home, such as a doorbell unit at the entrance to the home, acts as a powerful deterrent against would-be burglars.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 is a functional block diagram illustrating one example implementation of an A/V doorbell according to various aspects of the present disclosure;

DETAILED DESCRIPTION

Figure 1:
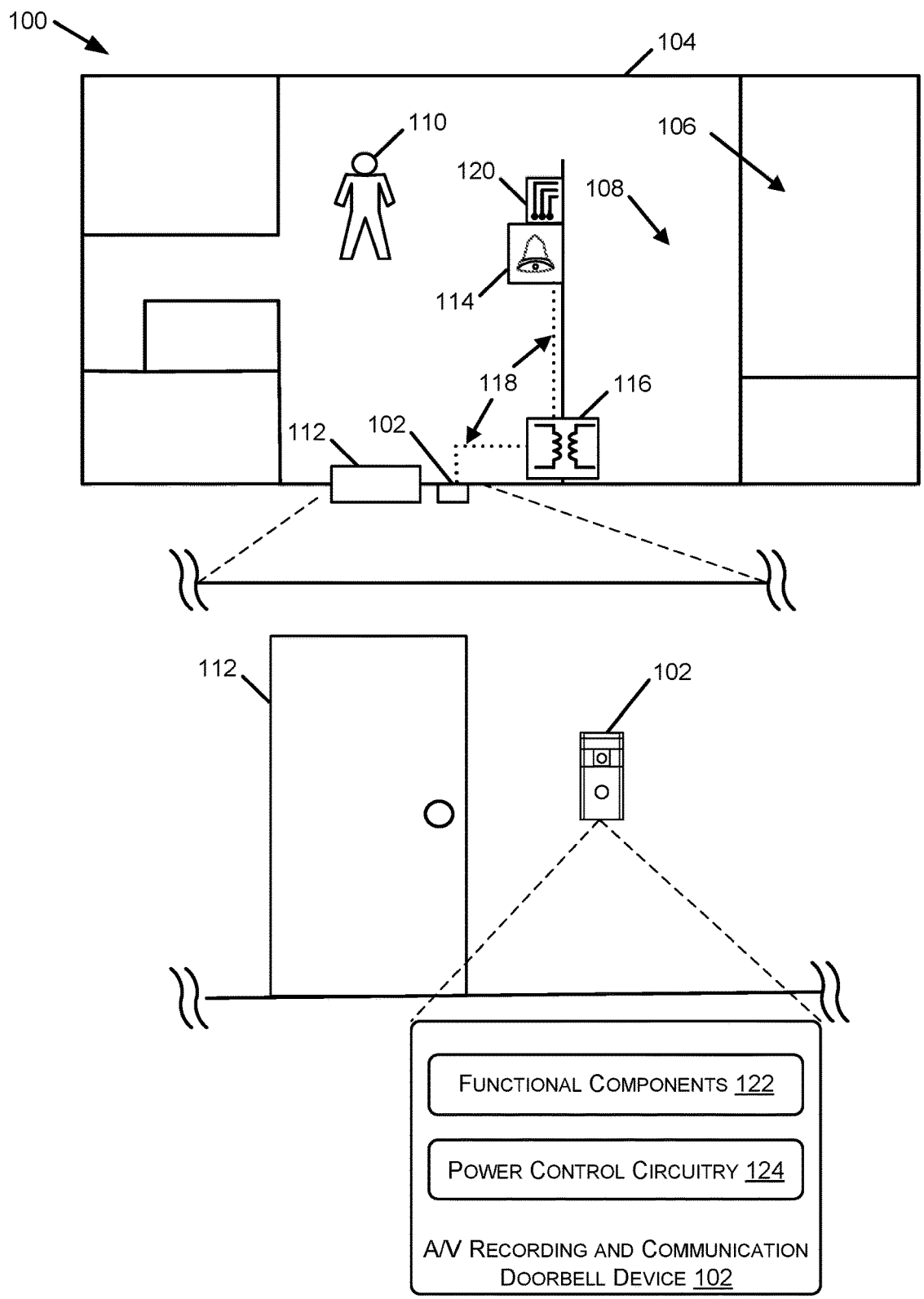
FIG. 1 is a schematic diagram illustrating an example environment that includes an audio/video (A/V) recording and communication doorbell device with power control circuitry according to various aspects of the present disclosure.

One aspect of the present embodiments includes the realization that line-powered (e.g., AC mains) audio/video (A/V) recording and communication doorbell devices ("A/V doorbells") often include batteries to provide power for continued operation during interruptions in the line power. This application describes A/V doorbells that reduce or eliminate power disruptions without using a battery. The A/V doorbells may be located near an external door of a structure, such as a house, office building, apartment, condominium, store front, and the like, to capture video data (e.g., video and audio) of a space outside of the structure that is proximate to the external door. In this way, occupants of the structure may obtain video data related to activity around the external door. For example, the A/V doorbells may capture video data of a perpetrator attempting to gain access to the structure. In other examples, the A/V doorbells may capture video data of a parcel carrier attempting to make a delivery to the structure. Video data from A/V doorbells may help to prevent unwanted access to a structure and/or prevent damage to the structure by alerting occupants of the structure to unwanted individuals near the structure.

A/V doorbells are typically coupled to a signaling device within the structure. The signaling device, which may be a digital signaling device or a mechanical signaling device, produces sound to alert an occupant of the structure that a person external to the structure has pressed a front button of the A/V doorbell. Mechanical signaling devices may operate by a first component, such as a hammer or piston, being actuated to contact a second component, such as a bar or bell, producing the well known "ding-dong" sound. Digital signaling devices, also sometimes referred to as electronic signaling devices, produce sound by activating an integrated circuit that causes a melody to be played.

In various implementations, an A/V doorbell may include a button that, when pressed, activates a signaling device within the structure. In certain implementations, a structure may include preexisting doorbell power circuitry that may activate a signaling device within the structure. The doorbell activation device may be located near an external door of the structure, and electrically coupled to the signaling device via the doorbell power circuitry. Implementations of the A/V doorbells described herein may be coupled to the doorbell power circuitry and used instead of, or in addition to, the preexisting doorbell activation device (e.g., a doorbell button).

In conventional doorbell systems, power is applied to a signaling device in response an individual depressing a doorbell activation device (e.g., a button) disposed on the exterior of a structure. The amount of power supplied activates the signaling device to produce a sound to alert an occupant of the structure. In particular implementations, the A/V doorbell may replace the doorbell button of conventional systems. The A/V doorbell may include a number of functional components that draw power using the preexisting doorbell power circuitry to operate. For example, the A/V doorbell may include one or more cameras, one or more microphones, one or more communication systems, one or more lighting devices, one or more additional sensors, one or more processors, memory, combinations thereof, and the like, that may use power for operation. In scenarios where both the A/V doorbell and the signaling device are coupled to the doorbell power circuitry, the A/V doorbell may be cut-off from at least a portion of the power applied via the doorbell power circuitry. That is, since at least a portion of the power supplied via the doorbell power circuitry may be diverted to the signaling device to produce sound, the amount of power supplied to the A/V doorbell may be reduced when the doorbell button is pressed and while the signaling device is producing sound. In various situations, the amount of power supplied to the A/V doorbell may be insufficient for functional components of the A/V doorbell to operate properly. To compensate for any deficiencies in the amount of power supplied to various functional components of the A/V doorbell, such as during activation of the signaling device, power control circuitry of the A/V doorbell and a doorbell adapter device coupled to the signaling device may be configured to supply power to both the signaling device and the A/V doorbell from the doorbell power circuitry. The power control circuitry of the A/V doorbell may control the amount of power available to the functional components of the A/V doorbell. In addition, the doorbell adapter device coupled to the signaling device may divert power available via the doorbell power circuitry to the signaling device and away from the A/V doorbell upon activation of the signaling device.

In conventional systems, A/V doorbells may include a battery to supply power to one or more functional components of the A/V doorbell when the doorbell button is pressed and while the signaling device is producing sound. The battery may include a rechargeable battery that is recharged by drawing power from the doorbell power circuitry. In particular, power may be supplied by the battery to functional components of the A/V doorbell in situations where the A/V doorbell is unable to draw sufficient power from the doorbell power circuitry to operate the functional components.

In implementations described herein, signaling devices coupled to the doorbell power circuitry of a structure in addition to an A/V doorbell may have different power requirements. For example, a digital signaling device may have relatively low power requirements. To illustrate, a digital signaling device may produce sound using an applied voltage of no greater than 7 W, no greater than 6 W, no greater than 5 W, no greater than 4 W, or no greater than 3 W. In other examples, a mechanical signaling device may produce sound using an applied voltage of at least 8 W, at least 10 W, at least 12 W, at least 14 W, at least 16 W, at least 20 W, at least 24 W, or at least 30 W. The A/V doorbell and the signaling device may be connected in series via the doorbell power circuitry. Additionally, the A/V doorbell and the signaling device may have different power requirements. In these situations, the power available to the A/V doorbell and the signaling device via the doorbell power circuitry typically is less than that of the lowest power device coupled to the doorbell power circuitry. In implementations where a mechanical signaling device is coupled to the A/V doorbell via the doorbell power circuitry, the mechanical signaling device has a higher power requirement than the A/V doorbell. In other implementations where a digital signaling device is coupled to the A/V doorbell, the A/V doorbell has a higher power requirement than the digital signaling device. In scenarios where the lowest power device coupled to the doorbell power circuitry is a digital signaling device, the amount of power available to the A/V doorbell via the doorbell power circuitry may not be sufficient to operate the functional components of the A/V doorbell during activation of the digital signaling device. In additional situations where the lowest power device coupled to the doorbell power circuitry is the A/V doorbell, the amount of power available to the mechanical signaling device via the doorbell power circuitry may not be sufficient to produce sound.

Based on the power requirements of the signaling device and the A/V doorbell, either power control circuitry of the A/V doorbell or a doorbell adapter device coupled to the signaling device may increase the power available during activation of the signaling device. For example, in situations where a digital signaling device is coupled to the A/V doorbell via doorbell power circuitry of a structure, power control circuitry of the A/V doorbell may increase power available to functional components of the A/V doorbell during activation of the digital signaling device. In other examples where a mechanical signaling device is coupled to the A/V doorbell, a doorbell adapter device coupled to the mechanical signaling device may increase power available to the signaling device in order to cause the mechanical signaling device to produce sound. In this way, both the signaling device and the A/V doorbell are supplied with power sufficient to operate both devices during activation of the signaling device. In the absence of an additional power source, such as a battery, and without the implementations of the power control circuitry and doorbell adapter device described herein, the power supplied via the doorbell power circuitry may be insufficient for at least one of the signaling device or the A/V doorbell to operate properly at the same time. Further, in implementations described herein, the power control circuitry of the A/V doorbell and the doorbell adapter device are configured to be used with both mechanical signaling devices and digital signaling devices. Accordingly, different power control circuitry and different doorbell adapter devices are not needed in order for the A/V doorbell and the signaling device to operate properly when activated contemporaneously, according to various aspects of the present embodiments.

The remaining detailed description describes the present implementations with reference to the drawings. In the drawings, reference numbers label elements of the present implementations. These reference numbers are reproduced below in connection with the discussion of the corresponding drawing features.

FIG. 1 illustrates an example environment 100 that includes an audio/video (A/V) recording and communication doorbell device ("A/V doorbell") 102 with power control circuitry according to various aspects of the present disclosure. The environment 100 may also include a structure 104. The structure 104 may include a house, an apartment, a condominium, an office, a place of business, combinations thereof, and the like. The structure 104 may include a number of rooms, such as a first representative room 106 and a second representative room 108. In addition, the structure 104 may include one or more occupants, such as an occupant 110. The occupant 110 may reside in the structure 104 or be otherwise associated with the structure 104 in some way, such as a patron of a place of business or a worker in an office.

The structure 104 may also include an external door 112 and a signaling device 114 that may produce sound upon activation. The external door 112 may be opened to allow entry to or exit from the structure 104. The signaling device 114 may produce sound to alert the occupant 110 that someone external to the structure 104 has activated the signaling device 114. In some examples, the signaling device 114 may be activated by an individual that is outside of the structure 104 and wanting to gain entry into the structure 104. In other examples, the signaling device 114 may be activated by an individual that is outside of the structure 104 to cause the occupant 110 to open the external door 112 such that the individual may speak with the occupant 110, make a delivery to the structure 104, and so forth.

The signaling device 114 may include a mechanical signaling device or a digital signaling device. To produce sound, the signaling device 114 may draw power from a power source. The power source may be connected to a power grid and/or power generator. In particular implementations, the structure 104 may include a power source that supplies power to various portions of the structure 104. For example, the structure 104 may include one or more outlets that may supply power from the power source to devices within the structure 104. In addition, the structure 104 may include wiring that is coupled to lights, switches, and other devices to provide power from the power source to various additional devices within the structure 104. The power from the power source can correspond to a particular voltage or range of voltages and to a particular current or range of currents. In various examples, power from the power source can correspond to voltages having values of about 110 V, about 120 V, about 230 V, or between about 110 V and about 230 V. Further, power from the power source can correspond to currents having frequency values of about 50 Hz, about 60 Hz, or between about 50 Hz and about 60 Hz. The power source for the structure 104 may be an alternating current (AC) power source.

In certain implementations, the signaling device 114 may operate at a voltage and/or frequency that is different from the voltage and/or frequency of the power source of the structure 104. For example, the signaling device 114 may operate at voltages of 8 V, 12 V, 16 V, 20 V, or 24 V. In some examples, the signaling device 114 may operate at voltages less than 8 V. The structure 104 may include circuitry and wiring, such as a transformer 116 and wiring 118, coupled to the power source to supply a voltage that may be used by the signaling device 114 to produce sound. To illustrate, the transformer 116 may decrease the voltage from the power source to a value, such as 12 V or 16 V, that may be supplied to the signaling device 114 to generate sound. The transformer 116 and the wiring 118 may comprise at least a portion of doorbell power circuitry of the structure 104.

The A/V doorbell 102 may be attached to the structure 104 at a location that is proximate to the external door 112. For example, the A/V doorbell 102 may include a mounting apparatus to mount the A/V doorbell 102 to the structure 104. The A/V doorbell 102 may draw power from the circuitry and wiring of the structure 104, such as the transformer 116 and the wiring 118, that is used to provide power to the signaling device 114. In this way, the A/V doorbell 102 may obtain power to operate various components.

The environment 100 may also include a doorbell adapter device 120. The doorbell adapter device 120 may be added to the preexisting doorbell power circuitry included in the structure 104 that includes the transformer 116 and the wiring 118. The doorbell adapter device 120 may be configured to supply power to the A/V doorbell 102 when the signaling device 114 is not activated and to supply power to both the signaling device 114 and the A/V doorbell 102 when the signaling device 114 is activated to produce sound. The doorbell adapter device 120 may include one or more components, such as a switch, a field effect transistor (FET), an electronic relay, such as a triode for alternating current (TRIAC) or another type of thyristor, an alternating current (AC)/direct current (DC) converter, voltage modification circuitry, such as buck circuitry to step down a voltage, combinations thereof, and the like.

In illustrative implementations, input at the A/V doorbell 102, such as pushing or selecting a front button, may cause the A/V doorbell 102 to activate one or more components of the doorbell adapter device 120 to supply power to the signaling device 114 and activate the signaling device 114. For example, the A/V doorbell 102 may send a signal to activate a switch included in the doorbell adapter device 120 to divert power from the A/V doorbell 102 to the signaling device 114. In these situations, supplying power to the signaling device 114 may cause the amount of power supplied to the A/V doorbell 102 to decrease. Additionally, after the signaling device 114 is no longer activated, the doorbell adapter device 120 may cause power from the doorbell power circuitry to be supplied to the A/V doorbell 102 instead of to the signaling device 114. In certain implementations, a switch included in the doorbell adapter device 120 may be deactivated to divert power to the A/V doorbell 102 and away from the signaling device 114.

Additionally, the doorbell adapter device 120 may include circuitry to supply power to the signaling device 114 in situations where the signaling device 114 is a mechanical signaling device and the amount of power available via the doorbell power circuitry may be insufficient for both the signaling device 114 and the A/V doorbell 102 to operate contemporaneously. In various implementations, the doorbell adapter device 120 may include a current source that increases the amount of current available to the signaling device 114. The doorbell adapter device 120 may also include boost converter circuitry to increase an amount of power available to the signaling device 114.

In particular implementations, the A/V doorbell 102 may include one or more functional components 122. The one or more functional components 122 may include components that draw an amount of power to operate, such as one or more cameras, one or more microphones, one or more lighting devices, one or more processors, memory, one or more communication systems, combinations thereof, and the like. In various implementations, the A/V doorbell 102 may capture image data, sound data, or both image data and sound data in the vicinity of the external door 122. The image data and/or the sound data may be related to individuals, objects, or both individuals and objects that are within a field of view of the A/V doorbell 102.

The A/V doorbell 102 may also be used by occupants 110 of the structure 104 to communicate with individuals outside of the structure 104. For example, the A/V doorbell 102 may communicate audio data and/or video data between one or more individuals located outside of the structure 104 and one or more occupants 110 within the structure 104. In some examples, the A/V doorbell 102 may communicate audio data and/or video data between individuals located outside of the structure 104 and one or more individuals that are associated with the structure 104 and not located within the structure 104. To illustrate, an owner of the structure 104 that is not inside the structure 104 may communicate with one or more individuals outside of the structure 104, such as a delivery person, via the A/V doorbell 102.

Further, the A/V doorbell 102 may include power control circuitry 124 to supply power to the functional components 122 when the signaling device 114 is activated. In situations where the signaling device 114 includes a digital signaling device, the power control circuitry 124 may supply power to the functional components 122 during activation of the signaling device 114. The power control circuitry 124 may include a current source that may supply current to the functional components 122 when the signaling device 114 is activated. The power control circuitry 124 may also include boost converter circuitry to increase the amount of power available to the functional components 122 during activation of the signaling device 114.

In illustrative implementations, input may be received at the A/V doorbell 102 to activate the signaling device 114. For example, an individual may push a button on the A/V doorbell 102, and depressing the button may cause a signal to be sent by the A/V doorbell 102 to activate the signaling device 114 to produce sound. The signal to activate the signaling device 114 may be received at the doorbell adapter device 120, and the doorbell adapter device 120 may operate to divert power from the A/V doorbell 102 to the signaling device 114. To illustrate, a switch included in the doorbell adapter device 120 may be operated to divert power supplied by the transformer 116 to the signaling device 114.

The doorbell adapter device 120 may include first parallel circuitry having two branches joined at a first node and a second node, where current flows from the transformer 116 into the first node and splits between the first branch and the second branch before being joined at the second node. A first branch of the first parallel circuitry may include shunting circuitry and the second branch may include signaling device control circuitry to activate the signaling device 114. In various implementations, the shunting circuitry may include a non-linear device. The non-linear device may act as a voltage clamp, in particular situations. In illustrative implementations, the non-linear device may present a relatively low resistance for low to moderate values of current, and a current-limited conduction path providing a relatively higher value of incremental resistance. In particular implementations, the non-linear device may offer a low incremental resistance when the voltage across its terminals exceeds a threshold value.

The doorbell adapter device 120 may also include current monitoring circuitry to monitor an amount of current corresponding to the second node of the first parallel circuitry. In particular implementations, the current monitoring circuitry may be coupled to the shunting circuitry of the first branch. In certain implementations, the shunting circuitry may include a current source. In particular illustrative examples, the shunting circuitry may include a transistor, such as a metal oxide semiconductor field effect transistor (MOSFET), and the current monitoring circuitry may be coupled to a gate of the transistor. The components of the first branch and the second branch of the first parallel circuitry may be configured to apportion the amount of current in each branch to accommodate the power needs of the signaling device 114 and the A/V doorbell 102. In illustrative examples, the signaling device 114 may include a mechanical signaling device. In these situations, the signaling device 114 may have power requirements that exceed the power requirements of the A/V doorbell 102. In particular illustrative examples, a mechanical signaling device may have power requirements that leave insufficient power available in doorbell power circuitry of the structure 102 for the functional components 122 to operate when the signaling device 114 is activated.

In various implementations where the signaling device 114 includes a mechanical signaling device, the current monitoring circuitry may detect a current that is above a threshold current and trigger the MOSFET to draw relatively low amounts of current through the first branch, resulting in relatively higher currents being sent through the second branch. In this way, the power in the second branch increases and supplies at least a portion of the power used by the signaling device 114 to produce sound. In particular implementations, boost converter circuitry of the doorbell adapter device 120 may supply any remaining power needed by the signaling device 114 to produce sound.

Further, the power control circuitry 124 may also include second parallel circuitry having two branches joined at an additional first node and an additional second node. The additional first node of the second parallel circuitry may be coupled to the second node of the first parallel circuitry and the additional second node of the second parallel circuitry may be coupled to the transformer 116. The first branch of the second parallel circuitry may include additional shunting circuitry and the second branch of the second parallel circuitry may include the power control circuitry 124. The components of the second parallel circuitry may also be configured to apportion the amount of current in the first branch and the second branch to accommodate the power needs of the signaling device 114 and the A/V doorbell 102. In illustrative examples where the signaling device 114 is a mechanical or digital signaling device, the additional shunting circuitry of the first branch of the second parallel circuitry may draw current to increase the current detected by the current monitoring circuitry of the first parallel circuitry while leaving sufficient current in the second branch of the second parallel circuitry to power the functional components 122 of the A/V doorbell 102. In various implementations, the additional shunting circuitry may include a non-linear device. The non-linear device may act as a voltage clamp, in particular situations. In illustrative implementations, the non-linear device may present a relatively low resistance for low to moderate values of current, and a current-limited conduction path providing a relatively higher value of incremental resistance. In particular implementations, the non-linear device may offer a low incremental resistance when the voltage across its terminals exceeds a threshold value.

In other illustrative examples, the signaling device 114 may include a digital signaling device having a relatively low operating power so that a product of the loop current and the voltage across the A/V doorbell 102 is less than that required to supply the functional components of the A/V doorbell 102. In these scenarios, activation of the signaling device 114 results in additional current being drained with shunting circuitry of the doorbell adapter device 120, which in turn increases the effective power consumption of the doorbell adapter device 120. The power available across the terminals of the A/V doorbell 102 is sufficient to operate the functional components 122, but the voltage across the terminals of the A/V doorbell 102 is not guaranteed to be above a minimum voltage needed to operate the functional components 122. Accordingly, the power control circuitry 124 may include boost converter circuitry to supply the functional components 122 with sufficient voltage such that the functional components 122 can continue operating during activation of the signaling device 114.

Figure 2:
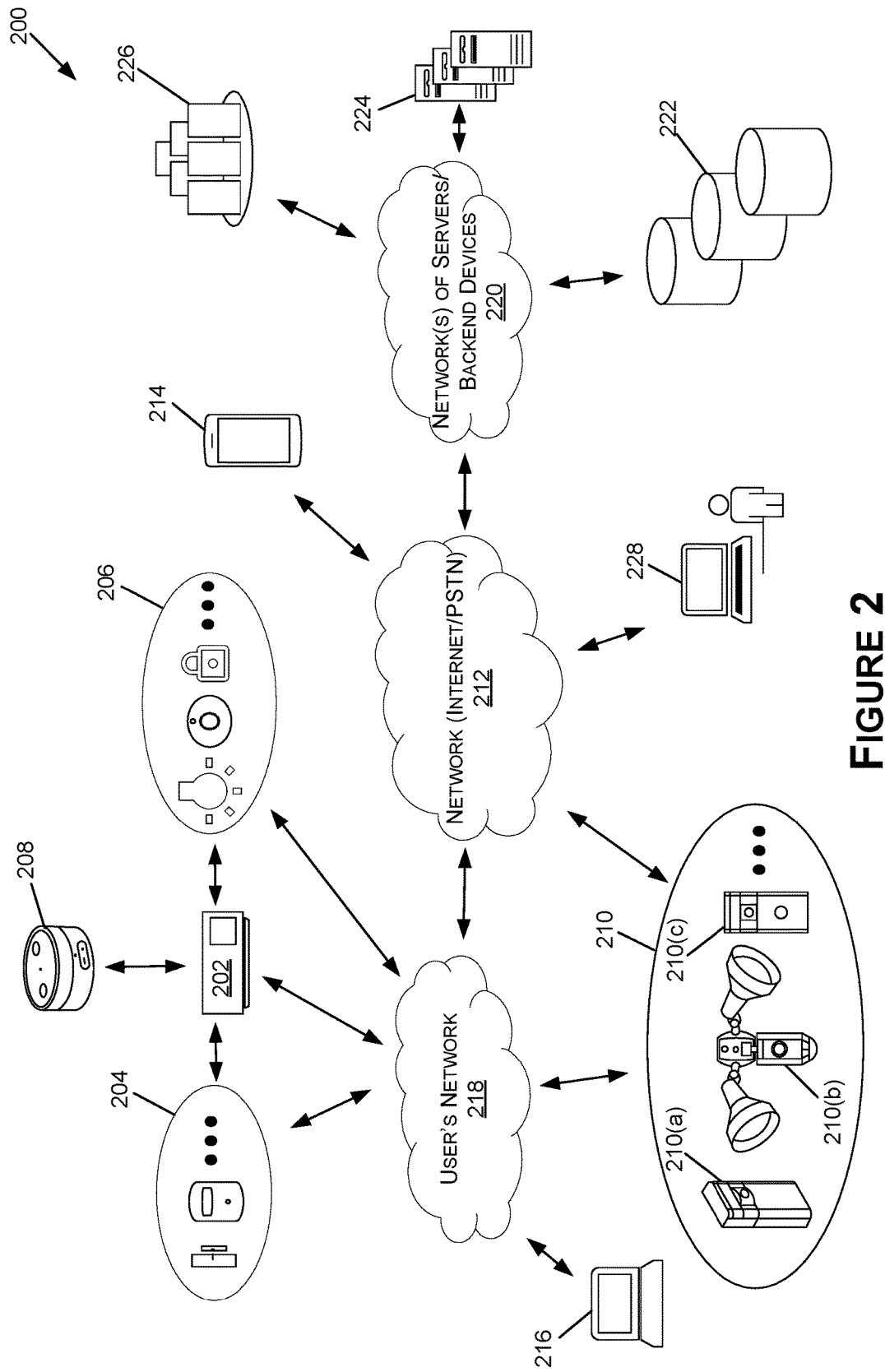
FIG. 2 is a schematic diagram illustrating a system for communicating in a network according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various implementations, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, etc.), when remotely monitored and controlled via a network (Internet/a public switched telephone network (PSTN)) 212 (which may be similar to, and represent the network 112), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively be referred to herein as "A/V devices 210" or "A/V device 210") (which may represent, and/or be similar to, the A/V doorbell 102 of FIG. 1). The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some implementations, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present implementations, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some implementations, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various implementations, the VA device 208 may include an array of speakers that are able to produce beams of sound. Although illustrated as a separate component in FIG. 2, in some implementations the VA device 208 may not be a separate component from the hub device 202. In such implementations, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various implementations, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the doorjamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present implementations, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216. The client devices 214, 216 may communicate with and/or be associated with (e.g., capable of access to and control of) the A/V devices 210, a smart-home hub device 202, the VA device 208, sensors 204, and/or automation devices 206. In various implementations, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some implementations, the client devices 214, 216 includes a connected device, such as a smart watch, Bluetooth headphones, another wearable device, or the like. In such implementations, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 may comprise a computer program or other computer executable code that, when executed by processor(s) of the backend server 224, causes the backend server 224 to wait for requests from other computer systems or software (clients) and provide responses. In implementations, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various implementations, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some implementations, the backend API 226 maintains user data and provides user management capabilities, thereby reducing the load (e.g., memory and processor consumption) of the client devices 214, 216.

In various implementations, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/backend devices 220 (e.g., the backend server 224, the backend API 226, the storage devices 222, etc.) may be referred to herein as a "network device" or "network devices."

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In additional implementations, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present implementations, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control their own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some implementations, via one or more of the components of the network of backend servers/backend devices 220).

Figure 3:
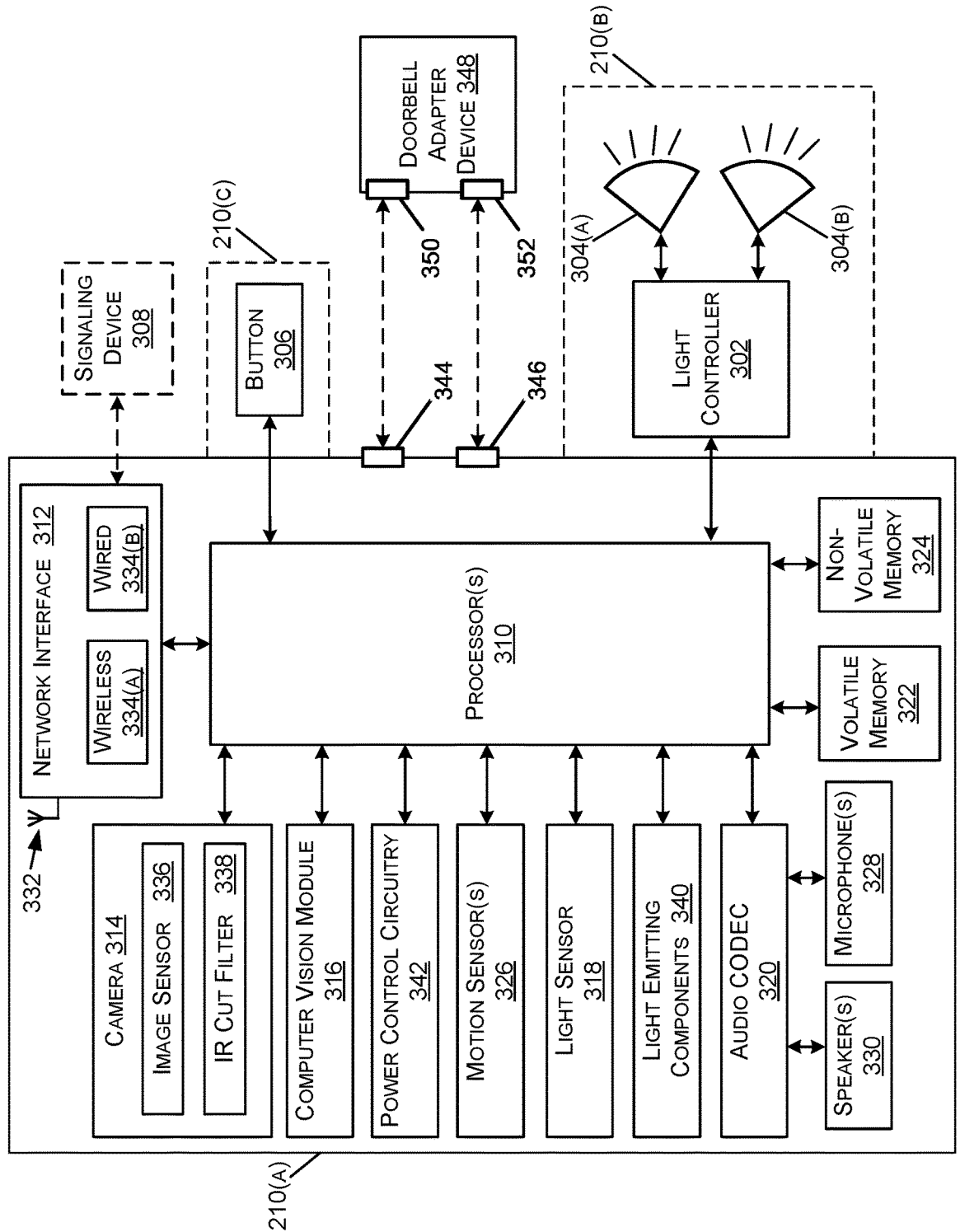
FIG. 3 is a functional block diagram of an A/V recording and communication doorbell device ("A/V doorbell") according to various aspects of the present disclosure.

FIG. 3 is a functional block diagram for an audio/video (A/V) device according to various aspects of the present disclosure. In some implementations, the one or more A/V devices 210 may include the security camera 210(a). In other implementations, the one or more A/V devices 210 may include the light camera 210(b), which may include some or all of the components of the security camera 210(a) in addition to a light controller 302 and one or more lights 304(a), 304(b). In some implementations, the one or more A/V devices 210 may include the video doorbell 210(c), which may include some or all of the components of the security camera 210(a) in addition to a button 306, and in some implementations, a connection to a signaling device 308 (e.g., a pre-installed signaling device, such as a wired signaling device, and/or a wireless signaling device, connected over Wi-Fi, BLE, or another wireless communication protocol). In illustrative implementations, the A/V doorbell 102 of FIG. 1 may include some or all of the components included in the A/V device of FIG. 3 and the signaling device 308 may correspond to the signaling device 114 of FIG. 1.

With further reference to FIG. 3, the A/V device 210 may include a processor(s) 310, a network interface 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the network interface 312, and may perform various functions as described in the present disclosure. In various implementations, when the processor(s) 310 is triggered by the motion sensor(s) 326, the camera 314, the speaker(s) 330, the microphone(s) 328, the network interface 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the network interface 312 and the camera 314.

With further reference to FIG. 3, the network interface 312 may comprise an integrated circuit including a processor core, memory, and programmable input/output peripherals. The network interface 312 may be operatively connected to the processor(s) 310. In some implementations, the network interface 312 is configured to handle communication links between the A/V device 210 and other, external devices, external receivers, external transmitters, and/or external transceivers, and to route incoming/outgoing data appropriately. For example, inbound data from an antenna 332 of the network interface 312 may be routed through the network interface 312 before being directed to the processor(s) 310, and outbound data from the processor(s) 310 may be routed through the network interface 312 before being directed to the antenna 332 of the network interface 312. As another example, the network interface 312 may be configured to transmit data to and/or receive data from a remote network device (e.g., one or more components of the network(s) of servers/backend devices 220 described in FIG. 2). The network interface 312 may include wireless 334(a) and wired 334(b) adapters. For example, the network interface 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The network interface 312 may receive inputs, such as power and/or data, from the camera 314, the processor(s) 310, the button 306 (in implementations where the A/V device 210 is the video doorbell 210(c)), the motion sensors 326, a reset button (not shown in FIG. 3 for simplicity), and/or the non-volatile memory 324. The network interface 312 may also include the capability of communicating over wired connections, such as with a signaling device 308. For example, when the button 306 of the video doorbell 210(c) is pressed, the network interface 312 may be triggered to perform one or more functions, such as to transmit a signal over the wired 334(b) connection to the signaling device 308 (although, in some implementations, the signal be transmitted over a wireless 334(a) connection to the signaling device) to cause the signaling device 308 to emit a sound (e.g., a doorbell tone, a user customized sound, a ringtone, a seasonal ringtone, etc.). The network interface 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain implementations the non-volatile memory 324 may comprise serial peripheral interface (SPI) flash memory. In some implementations, the non-volatile memory 324 may comprise, for example, NAND or NOR flash memory. The volatile memory 322 may comprise, for example, DDR3 SDRAM (double data rate type three synchronous dynamic random-access memory). In the implementation illustrated in FIG. 3, the volatile memory 322 and the non-volatile memory 324 are illustrated as being separate from the processor(s) 310. However, the illustration of FIG. 3 is not intended to be limiting, and in some implementations the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some implementations, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the network interface 312 to the network (Internet/PSTN) 212. In various implementations, the camera 314 also includes memory, such as volatile memory that may be used when data is being buffered or encoded by the processor(s) 310 (and/or the camera processor). For example, in certain implementations the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 340 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device 210 with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some implementations, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some implementations, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the network interface 312 (in some implementations, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the network interface 312 to the network 212 via the user's network 218, routed by the backend server 224 and/or the backend API 226 and delivered to the client device(s) 214, 216 as described above in connection with FIG. 2. When the user speaks, after being transferred through the network 212, the user's network 218, and the network interface 312, the digital audio data from the user is decompressed by the audio CODEC 320 and emitted to the visitor through the speaker(s) 330.

With further reference to FIG. 3, the A/V device 210 may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various implementations, the output of the AC/DC adapter is in a range from about 9 V to about 15 V and in a range from about 0.5 A to about 5 A. These voltages and currents are examples provided for illustration and are not intended to be limiting.

In implementations described herein, a battery or other internal power source may not be included in the A/V device 210. In various implementations, the A/V device 210 may include an integrated circuit, such as the power control circuitry 342 capable of arbitrating between one or more voltage rails to supply power for the A/V device 210. In one aspect of the present disclosure, the A/V device 210 may continuously draw power from the AC power to power the A/V device 210. In some implementations, activation of the signaling device 308 may cause the power available to the A/V device 210 to be insufficient to operate the components of the A/V device 210. In certain implementations, the power control circuitry 342 may operate in conjunction with doorbell adapter device coupled to the signaling device 308 to supply power to the A/V device 210 and the signaling device 308 when power from an AC power source is diverted from the A/V device 210 to the signaling device 308 to produce sound.

Although not illustrated in FIG. 3, in some implementations, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some implementations, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some implementations, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the implementation, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some implementations, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various implementations, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present implementations, with reference to FIG. 3, the microphone(s) 328, the camera 314, the processor(s) 310, and/or the image sensor 336 may be components of the CVM 316. In some implementations, the CVM 316 may include an internal camera, image sensor, and/or processor, and the CVM 316 may output data to the processor(s) 310 in an output signal, for example.

As a result of including the CVM 316, some of the present implementations may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to, re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object. Decision making—Making the final decision required for the application, for example match/no-match in recognition applications.

One or more of the present implementations may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present implementations may use facial recognition hardware and/or software, as a part of the computer vision system. Various types of facial recognition exist, some or all of which may be used in the present implementations.

Some facial recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present implementations to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present implementations may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in implementations where the A/V device 210 includes a light camera, the A/V device 210 may include the light controller 302 and one or more lights 304(*a*), 304(*b*) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(*a*), 304(*b*). In some implementations, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other implementations, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in implementations where the A/V device 210 includes a doorbell, such as the video doorbell 210(*c*), the A/V device 210 may include the button 306. In implementations where the button 306 is a mechanical button (e.g., has a range of movement), the button 306 may make contact with a button actuator located within the video doorbell 210(*c*) when the button 306 is pressed. In implementations where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(*c*), such as transmitting an output signal, using the network interface 312, to the signaling device 308 to cause the signaling device 308 to output a sound (e.g., via the wired 334(*b*) connection to the signaling device 308 and/or a wireless 334(*a*) connection to the signaling device 308). In addition, the processor(s) 310 may transmit an output signal (e.g., a message), using the network interface 312, to the client device(s) 214, 216 to indicate to the user(s) of the client device(s) 214, 216 that a person is present at the A/V device 210 (in some implementations, via at least one of the hub device 202, the VA device 208, and/or one or more component of the network of servers/backend devices 220).

Additionally, the A/V device 210 may include a first terminal 344 and a second terminal 346. The first terminal 344 and the second terminal 346 may be used to couple the A/V device 210 to doorbell power circuitry of a structure, such as the structure 104 of FIG. 1. In this way, the first terminal 344 and the second terminal 346 may couple the A/V device 210 to a power source that may supply power to components of the A/V device 210. Further, in particular implementations, the first terminal 344 and the second terminal 346 may be used to couple the A/V device 210 to a signaling device, such as the signaling device 308, via the doorbell power circuitry. In various implementations, the A/V device 210 may be coupled to a doorbell adapter device 348. The doorbell adapter device 348 may correspond to the doorbell adapter device 120 (FIG. 1) and may be configured to supply power to the A/V doorbell 210 when the signaling device 308 is not activated and to supply power to both the signaling device 308 and the A/V doorbell 210 when the signaling device 308 is activated to produce sound. The doorbell adapter device 348 may include an additional first terminal 350 and an additional second terminal 352 to couple the doorbell adapter device 348 to the A/V device 210. In certain implementations, the additional first terminal 350 and the additional second terminal 352 may couple the doorbell adapter device 348 to the signaling device 308, while in other implementations, other terminals of the doorbell adapter device 348 may couple the doorbell adapter device 348 to the signaling device 308.

Although the A/V recording and communication device 210 (or A/V device 210) is referred to herein as an "audio/video" device, the A/V device 210 need not have both audio and video functionality. For example, in some implementations, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

FIG. 4 is another functional block diagram illustrating an implementation of the A/V device 210 according to various aspects of the present disclosure. In some implementations, the A/V device 210 may represent, and further include one or more of the components from, the A/V recording and communication doorbell 210(*c*), the A/V recording and communication security camera 210(*a*), and/or the floodlight controller 210(*b*). Additionally, in some implementations, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various implementations, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the implementation), and/or motion data 412 using the camera 314 and/or the motion sensor(s) 326. In some implementations, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the backend server 224 using the network interface 312. In various implementations, the device application 404 may also configure the processor(s) 310 to generate and transmit an output signal 418 that may include the image data 406, the audio data 408, the text data 414, the input data 410, and/or the motion data 412. In some of the present implementations, the output signal 418 may be transmitted to the backend server 224 and/or the hub device 202 using the network interface 312. The backend server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the backend server 224, and the backend server 224 may then transmit (or forward) the output signal 418 to the client device(s) 214, 216. In other implementations, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314. The image data 406 may be representative of (e.g., depict) a physical environment in a field of view of the camera 406. In some implementations, the physical environment may include one or more objects (e.g., persons, vehicles, animals, items, etc.), and the image data 406 may be representative of the one or more objects, such as the one or more objects within the physical environment.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present implementations, such as those where the A/V device 210 does not include the motion sensor(s) 326, the motion data 412 may be generated by the camera 314. In such implementations, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input.

With further reference to FIG. 4, a message 416 may be generated by the processor(s) 310 and transmitted, using the network interface 312, to the client device 214, 216, the backend server 224, and/or the hub device 202. For example, in response to detecting motion using the camera 314 and/or the motion sensor(s) 326, the A/V device 210 may generate and transmit the message 416. In some of the present implementations, the message 416 may include at least the image data 406, the audio data 408, the text data 414, and/or the motion data 412.

As described herein, the message(s) 416 may include alerts, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia messages (MMS), voicemail messages, video signals, audio signals, data transmissions, and/or any other type of electronic communication that an electronic device can send to another electronic device.

The image data 406, the audio data 408, the text data 414, and/or the motion data 412 may be tagged with (e.g., a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As described herein, at least some of the processes of the backend server 224, the hub device 202, and/or the client device 214, 216 may be executed by the A/V device 210.

The A/V device 210 may also include power control circuitry 124 that controls power supplied to components of the A/V device 210. In particular implementations, the power control circuitry 124 may be configured to supply power to components of the A/V device 210 when the amount of power available to components of the A/V device 210 is less than a threshold amount of power. For example, the power control circuitry 124 may cause power to be supplied to components of the A/V device 210 during activation of a signaling device coupled to the A/V device 210. In certain implementations, the power control circuitry 124 may operate in conjunction with a doorbell adapter device coupled to a signaling device to cause power to be available to both the signaling device and the A/V device 210 during activation of the signaling device.

Figure 5:
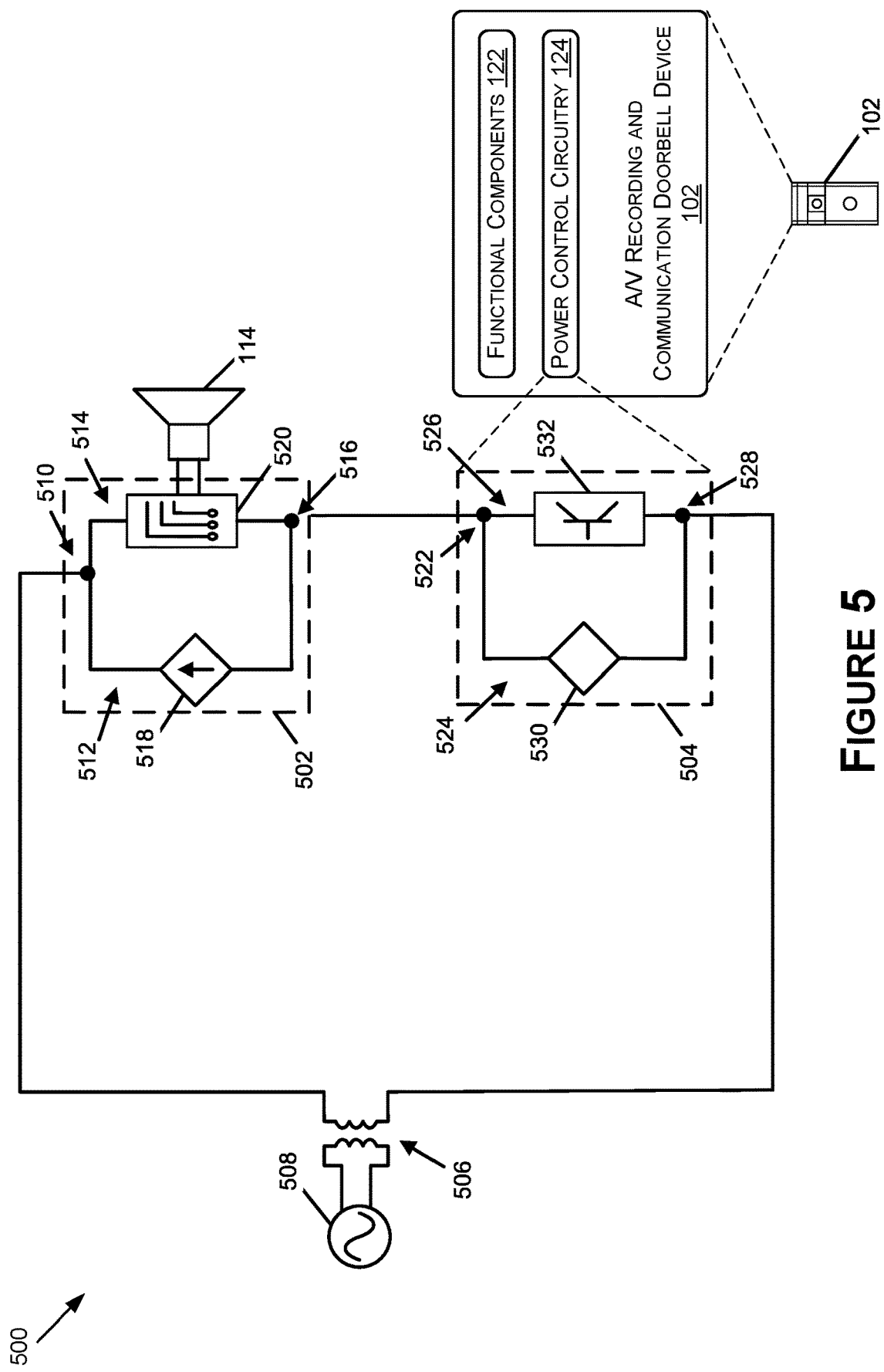
FIG. 5 is a schematic diagram illustrating an arrangement including power control circuitry and circuitry of a doorbell adapter device to provide power to a signaling device and an A/V doorbell according to various aspects of the present disclosure.

FIG. 5 is a schematic diagram illustrating an arrangement 500 including first parallel circuitry 502 and second parallel circuitry 504 to provide power to a signaling device 114 and an A/V recording and communication doorbell device ("A/V doorbell") 102 according to various aspects of the present disclosure. The first parallel circuitry 502 and the second parallel circuitry 504 are coupled to a transformer 506. In addition, the transformer 506 is coupled to a power source 508. The transformer 506 may modify a voltage supplied by the power source 508. For example, the transformer 506 may step down a voltage of the power source 508 from about 110 V to a voltage from about 8V to about 24 V. In other examples, the transformer 506 may step down a voltage of the power source 508 from about 220 V to a voltage from about 8 V to about 24 V. The transformer 506 may supply power to components coupled to the first parallel circuitry 502 and the second parallel circuitry 504.

The first parallel circuitry 502 may include a first node 510, and a first branch 512 and a second branch 514 that stem from the first node 510. The first parallel circuitry 502 may also include a second node 516 where the first branch 512 and the second branch 514 are rejoined. In various implementations, the first node 510 and the second node 516 may include, or otherwise be coupled to, one or more terminals, such as first and second terminals that couple the first parallel circuitry 502 to the transformer 506 and to the A/V doorbell 102.

Current at the first node 510 may be divided into two portions with a first portion flowing through the first branch 512 and a second portion flowing through the second branch 514. The current flowing through the first branch 512 and the second branch 514 may be combined at the second node 516. In certain examples, the amount of current flowing through the first branch 512 and the amount of current flowing through the second branch 514 may be substantially the same. In additional examples, the amount of current flowing through the first branch 512 and the amount of current flowing through the second branch 514 may be different. In particular implementations, the first branch 512 and the second branch 514 may include components that control the amount of current flowing through the respective branches 512, 514. In various implementations, the first parallel circuitry 502 may be included in the doorbell adapter device 120 of FIG. 1.

In the illustrative implementation of FIG. 5, the first branch 512 may include at least first current shunting circuitry 518. The first current shunting circuitry 518 may control the flow of current through the first branch 512 and, consequently, affect the flow of current through the second branch 514. That is, the first current shunting circuitry 518 may control the flow of current through the second branch 514 by causing an amount of the current at the first node 510 to bypass the second branch 514. In particular implementations, the first current shunting circuitry 518 may increase the amount of current flowing through the first branch 512, which results in decreased current flowing through the second branch 514. In other implementations, the first current shunting circuitry 518 may decrease the amount of current flowing through the first branch 512, causing increase current flow in the second branch 514. In various implementations, the first current shunting circuitry 518 may control the current flowing through the first branch 512 by modifying a resistance in the first branch 512. In these situations, as the first current shunting circuitry 518 increases the resistance in the first branch 512, the amount of current flowing through the first branch 512 decreases and as the first current shunting circuitry 518 decreases the resistance in the first branch 512, the amount of current flowing through the first branch 512 increases. In certain implementations, the first current shunting circuitry 518 may include a current source, such as a transistor. To illustrate, the first current shunting circuitry 518 may include a metal oxide semiconductor field effect transistor (MOSFET).

Additionally, in the illustrative implementation of FIG. 5, the second branch 514 may include signaling device control circuitry 520 that controls activation of the signaling device 114. The signaling device control circuitry 520 may cause the signaling device 114 to activate based on a signal received from the A/V doorbell 102. The signaling device control circuitry 520 may also include one or more components that increase an amount of power and/or voltage available to the signaling device 114 in situations where the power/voltage available via the transformer 506 is not sufficient for the signaling device 114 to produce sound and/or for A/V doorbell 102 to operate. For example, the signaling device control circuitry 520 may include boost converter circuitry to increase the voltage available to the signaling device 114. In additional implementations, the signaling device control circuitry 520 may include boost-buck circuitry to increase the amount of power supplied to the signaling device 114 when the power available to the signaling device 114 is less than a threshold amount of power and, also, to decrease the amount of power supplied to the signaling device 114 when the power available to the signaling device 114 is greater than a threshold amount of power. Also, the signaling device control circuitry 520 may include any type of energy storage device, such as a battery or a super capacitor (e.g., electric double layer capacitors (EDLCs)) in order to provide additional power to the signaling device 114 in case the total power available in the system is less than that required for simultaneous operation of the signaling device 114 and the A/V doorbell 102. In certain implementations, the signaling device control circuitry 520 may include H-bridge circuitry coupled to clock circuitry. The combination of H-bridge circuitry and the clock circuitry may provide a signal that triggers the signaling device 114 to produce sound.

The second parallel circuitry 504 may include a third node 522, and a first branch 524 and a second branch 526 that stem from the third node 522. The second parallel circuitry 504 may also include a fourth node 528 where the first branch 524 and the second branch 526 are rejoined. In various implementations, the third node 522 and the fourth node 528 may include, or otherwise be coupled to, one or more terminals, such as first and second terminals that couple the second parallel circuitry 504 to the first parallel circuitry and to the transformer 506.

Current at the third node 522 may be divided into two portions with a first portion flowing through the first branch 524 and a second portion flowing through the second branch 526. The current flowing through the first branch 524 and the second branch 526 may be combined at the fourth node 528. In certain examples, the amount of current flowing through the first branch 524 and the amount of current flowing through the second branch 526 may be substantially the same. In additional examples, the amount of current flowing through the first branch 524 and the amount of current flowing through the second branch 526 may be different. In particular implementations, the first branch 524 and the second branch 526 may include components that control the amount of current flowing through the respective branches 524, 526. In various implementations, the second parallel circuitry 504 may be included in the power control circuitry 124 of the A/V doorbell 102.

In the illustrative implementation of FIG. 5, the first branch 524 may include at least second current shunting circuitry 530. The second current shunting circuitry 530 may control the flow of current through the first branch 524 and, consequently, affect the flow of current through the second branch 526. That is, the second current shunting circuitry 530 may control the flow of current through the second branch 526 by causing an amount of the current at the third node 522 to bypass the second branch 526. In particular implementations, the second current shunting circuitry 530 may increase the amount of current flowing through the first branch 524, which results in decreased or increased current flowing through the second branch 526. The current may increase, in some embodiments, because the power control circuitry 124 may include a boost DC-DC converter, which can act as a constant power consumer (e.g., the incoming power is kept almost constant). Since the regulation of the current in the first branch 524 may cause a voltage decrease between the third node 522 and the fourth node 528, the voltage decrease may cause a consequent increase of the current in the second branch, so that the product of the voltage and the current remains the same. In most cases, increased current in first branch 524 will force the voltage across the third node 522 and the fourth node 528 to drop, and the current in the second branch 526 to rise.

In other implementations, the second current shunting circuitry 530 may decrease the amount of current flowing through the first branch 524, causing increased or decreased current flow in the second branch 526. In various implementations, the second current shunting circuitry 530 may control the current flowing through the first branch 524 by modifying a resistance in the first branch 524. In these situations, as the second current shunting circuitry 530 increases the resistance in the first branch 524, the amount of current flowing through the first branch 524 decreases and as the second current shunting circuitry 530 decreases the resistance in the first branch 524, the amount of current flowing through the first branch 524 increases. In certain implementations, the first current shunting circuitry 518 may include a current source.

The second branched circuitry 504 may also include power management circuitry 532 that may include one or more components to supply sufficient power to the functional components 122 during activation of the signaling device 114. In particular implementations, the power management circuitry 532 may include boost converter circuitry to increase the voltage available to the functional components 122 when the voltage available to the functional components 122 via the transformer 506 is less than a threshold voltage. In additional implementations, the power management circuitry 532 may include boost-buck circuitry to increase the voltage supplied to the functional components 122 when the voltage available to the functional components 122 is less than a threshold voltage and, also, to decrease the voltage supplied to the functional components 122 when the voltage available to the functional components 122 is greater than a threshold voltage.

In illustrative examples, input may be received by the A/V doorbell 102 to activate the signaling device 114. The A/V doorbell 102 may, in response to the input, send a signal to the signaling device 114 to produce sound. A doorbell adapter device 120 (FIGS. 1 and 6) coupled to the signaling device 114 may cause power to be diverted to the signaling device and away from the A/V doorbell 102, such that the signaling device 114 has sufficient power available to be activated and produce sound. In situations where the signaling device 114 includes a mechanical or digital signaling device, the amount of power needed by the signaling device 114 to have nominal performance may be higher than the power that can be safely distributed to the signaling device 114 without causing the amount of power available to the A/V doorbell 102 to be insufficient for at least one of the functional components 122 to operate. To cover such situations, an energy storage device may be added to the first parallel circuitry 502 to provide additional power for the signaling device 114 during a limited period of time. In particular examples, a voltage of 16 V may be supplied via the transformer 506 to power the signaling device 114 and the functional components 122 of the A/V doorbell 102. In some situations, the signaling device 114 may require more than 12 V to produce sound and the functional components 122 may require at least 4 V to operate. The components of the first parallel circuitry 502 and the second parallel circuitry 504 may be configured to control the amount of power available to the signaling device 114 and the functional components 122 such that both the signaling device 114 and the functional components 122 have a sufficient amount of power to operate.

For example, before the input is received at the A/V doorbell 102 to activate the signaling device 114, the power supplied by the transformer 506 is available to the A/V doorbell 102, but not to the signaling device 114. After the A/V doorbell 102 sends a signal to activate the signaling device 114, a first portion of the power available via the transformer 506 may be supplied to the signaling device 114 and a second portion of the amount of power available via the transformer 506 may be supplied to the A/V doorbell 102. In some embodiments, the A/V doorbell 102 has higher priority, so the doorbell always has at least the minimum power required to operate. In various implementations, the power requirements for the signaling device 114 and the A/V doorbell 102 may be different. In situations where the signaling device 114 includes a mechanical signaling device, the power requirements for the signaling device 114 may be greater than the power requirements for the A/V doorbell 102. In certain scenarios, the amount of power needed by the signaling device 114 to produce sound may be substantially equal to the amount of power supplied by the transformer 506. Additionally, as power becomes available to the signaling device 114, the amount of current flowing through the first branch 512 and the second branch 514 of the first parallel circuitry 502 may be substantially equal. Thus, the amount of power available between the first node 510 and the second node 516 may be split between the first branch 512 and the second branch 514 of the first parallel circuitry 502. To increase the amount of power supplied to the signaling device 114, the first current shunting circuitry 518 may increase the resistance in the first branch 512 such that the amount of the current at the first node 510 is channeled to the second branch 514 in relation to the amount of current channeled to the first branch 518. In certain implementations, the amount of current channeled to the first branch 518 may be near 0 amps, and substantially all of the current flowing at the first node 510 may be diverted to the second branch 514 such that the amount of current available to the signaling device 114 from the first branched circuitry 502 is increased.

In various implementations, the amount of power supplied to the signaling device 114 and the A/V doorbell 102 when both are coupled to the transformer 506, such as when the signaling device 114 is activated, may correspond to the amount of power consumed by the device with the smallest power requirement. In situations where the signaling device 114 includes a mechanical signaling device, the power requirements of the A/V doorbell 102 are less than the power requirements of the signaling device. 114. In these scenarios, components of the first parallel circuitry 502 and the second parallel circuitry 504 may be configured to supply the A/V doorbell 102 with at least a threshold amount of power from the transformer 506. The threshold amount of power supplied to the A/V doorbell 102 may correspond to an amount of power needed to operate the functional components 122 of the A/V doorbell 102. In addition, components of the first parallel circuitry 502 and components of the second parallel circuitry 504 may be configured to make a remainder of the power supplied by the transformer 506 available to the signaling device 114. In implementations where the remainder of the power supplied by the transformer 506 is not sufficient to activate the signaling device 114, the signaling device control circuitry 520 may include an energy storage device, such as a battery or a super capacitor (e.g., electric double layer capacitors (EDLC)) to increase the amount of power available to the signaling device 114 such that the amount of power available to the signaling device 114 is sufficient to cause the signaling device 114 to produce sound for a specified period of time, such as no greater than 20 seconds, no greater than 18 seconds, no greater than 16 seconds, no greater than 14 seconds, no greater than 12 seconds, no greater than 10 seconds, no greater than 8 seconds, no greater than 6 seconds, no greater than 4 seconds, or no greater than 2 seconds. After the signaling device 114 has been activated for a specified period of time, the amount of power drawn by the signaling device 114 may decrease and the signaling device 114 may be disconnected from the power supplied by the transformer 506. To illustrate, a switch may operate to disconnect the signaling device 114 from the transformer 506.

In implementations where the signaling device 114 includes a digital signaling device, the power requirements of the signaling device 114 may be less than the power requirements of the A/V doorbell 102. In these situations, components of the first parallel circuitry 502 and the second parallel circuitry 504 may be configured to supply the signaling device 114 with at least a threshold amount of power from the transformer 506. The threshold amount of power supplied to the A/V doorbell 102 may correspond to an amount of power needed to activate the signaling device 114 for a specified period of time, such as no greater than 20 seconds, no greater than 18 seconds, no greater than 16 seconds, no greater than 14 seconds, no greater than 12 seconds, no greater than 10 seconds, no greater than 8 seconds, no greater than 6 seconds, no greater than 4 seconds, or no greater than 2 seconds. In addition, components of the first parallel circuitry 502 and components of the second parallel circuitry 504 may be configured to make at least a threshold amount of the power supplied by the transformer 506 available to the A/V doorbell 102. The threshold amount of power may correspond to an amount of power sufficient to operate the functional components 122 of the A/V doorbell 102. Excess current that is not used by the signaling device 114 and/or the A/V doorbell 102 may be diverted away from these devices by the respective current shunting circuitry 518, 530 coupled to the signaling device 114 and the A/V doorbell 102.

Although the illustrative implementation of FIG. 5 shows that first parallel circuitry 502 and the second parallel circuitry 504 coupled directly to the transformer 506, there may be one or more components, such as a doorbell adapter device, in between the first parallel circuitry 502 and the transformer 506 and components between the second parallel circuitry 504 and the transformer 506. In addition, the first parallel circuitry 502, the second parallel circuitry 504, and the transformer 506 may be disposed in different locations within a structure, such as the structure 102 of FIG. 1. For example, the first parallel circuitry 502 may be located within a structure and proximate to the signaling device 114 and the second parallel circuitry 504 may be located external to the structure and within the A/V doorbell 102. Additionally, the transformer 506 may be disposed in a different location within the structure than the signaling device 114 and the first parallel circuitry 502.

Figure 6:
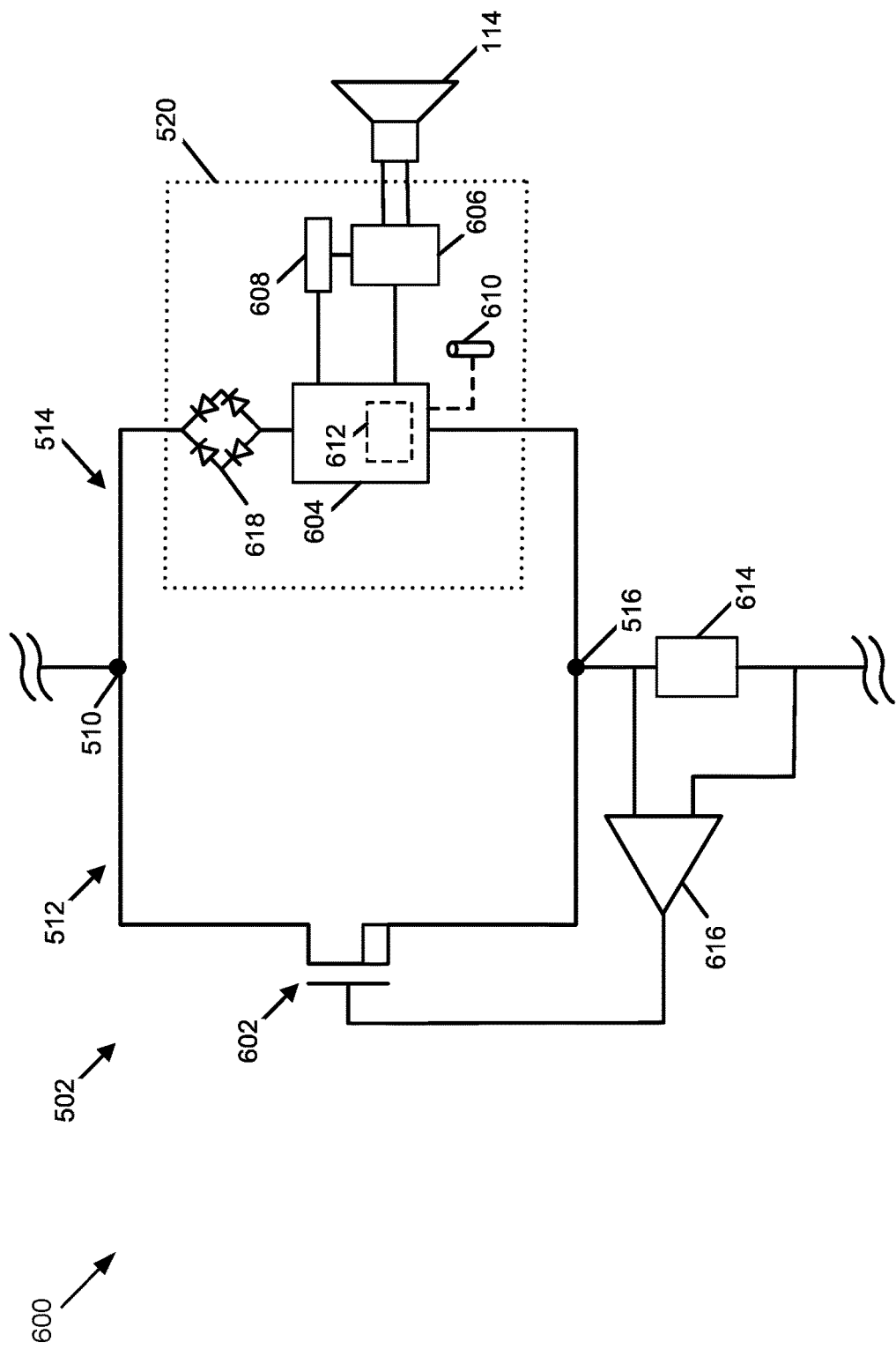
FIG. 6 is a schematic diagram illustrating an arrangement of a doorbell adapter device and other components of power control circuitry for a signaling device according to various aspects of the present disclosure.

FIG. 6 is a schematic diagram illustrating an arrangement 600 of a doorbell adapter device 120 and other components of signaling device control circuitry 520 according to various aspects of the present disclosure. The arrangement 600 may include the first parallel circuitry 502 having the first node 510, the first branch 512, the second branch 514, and the second node 516. In the illustrative implementation of FIG. 6, the arrangement 600 may include a current source 602. In various implementations, the current source 602 may include a transistor. The current source 602 may be, or may be included in, the first current shunting circuitry 518 of FIG. 5. In particular implementations, the current source 602 may include a MOSFET. In certain implementations, the current source 602 may include a non-linear device. The non-linear device may provide a relatively low resistance for low to moderate values of current, and a current-limited conduction path providing a relatively higher value of incremental resistance. In particular implementations, the non-linear device may offer a low incremental resistance when the voltage across its terminals exceeds a threshold value.

In addition, the signaling device control circuitry 520 may include boost or boost-buck circuitry 604. In certain implementations, the boost/boost-buck circuitry 604 may increase the voltage available to the signaling device 114 in some situations, and decrease the voltage available to the signaling device 114 in other situations. For example, when the voltage available to the signaling device 114 via a power source, such as the transformer 116 of FIG. 1 or the transformer 506 of FIG. 5, is less than a threshold amount of voltage, the boost/boost-buck circuitry 604 may increase the voltage available to the signaling device 114. The boost/boost-buck circuitry 604 may produce an output voltage that is greater than an input voltage for the boost/boost-buck circuitry 604. In various implementations, the boost/boost-buck circuitry 604 may increase the voltage available to the signaling device 114 when the signaling device 114 includes a mechanical signaling device. In additional examples, when the voltage available to the signaling device 114 via a power source is greater than the amount of voltage required to activate the signaling device 114, the boost-buck circuitry 604 may decrease the voltage available to the signaling device 114. The boost-buck circuitry 604 may decrease the voltage available to the signaling device 114 by producing an output voltage that is less than an input voltage of the boost-buck circuitry 604. In further implementations, the boost-buck circuitry 604 may operate in conjunction with the current source 602 to increase or decrease the power available to the signaling device 114. In particular implementations, when the signaling device 114 needs an increased amount of power to produce sound, the current source 602 may divert current from the first branch 512 to the second branch 514 in order to increase the power available to the signaling device 114 in coordination with the boost-buck circuitry 604 also increasing the voltage available to the signaling device 114. In additional implementations, when an amount of power available to the signaling device 114 exceeds the power requirements of the signaling device 114, the current source 602 may decrease the amount of current available in the second branch 514 by drawing current into the first branch 512 to decrease the power available to the signaling device 114 in conjunction with the boost-buck circuitry 604 also decreasing the voltage available to the signaling device 114.

The signaling device control circuitry 520 may also include H-bridge circuitry 606 and clock circuitry 608. The H-bridge circuitry 606 may modify a polarity of a voltage applied to the signaling device 114. The clock circuitry 608 may control the output of the H-bridge circuitry 606 according to a particular frequency. In certain implementations, the clock circuitry 608 may operate on a frequency from about 30 Hz to about 120 Hz. In illustrative implementations, the clock circuitry 608 may operate on a frequency from about 50 Hz to about 70 Hz. In a particular illustrative implementation, the clock circuitry 608 may operate on a frequency of about 60 Hz. The H-bridge circuitry 606 operating in conjunction with the clock circuitry 608 may output alternating current (AC) and direct current (DC) signals to power the signaling device 114. In various implementations, the H-bridge circuitry 606 may output an AC signal corresponding to the frequency of the clock circuitry 608 to power a signaling device 114 that is a mechanical signaling device or a digital signaling device. In additional implementations, upon receiving input to activate the signaling device 114, the H-bridge circuitry 606 may output a DC signal for a period of time and then output an AC signal. The DC signal may be output by the H-bridge circuitry 606 for a period of time from about 25 milliseconds to about 1 second before switching to outputting an AC signal. In other examples, the H-bridge circuitry 606 may output the DC signal for a period of time from about 100 milliseconds to about 500 milliseconds before switching to outputting an AC signal.

In some embodiments, the signaling device control circuitry 520 may include one or more energy storage devices 610, such as one or more supercapacitors, and the boost-buck circuitry 604 may include energy storage device charging circuitry 612. The one or more energy storage devices 610 may supply additional power to the signaling device 114 and may improve the performance of the signaling device 114, in some situations. In particular implementations, the one or more energy storage devices 610 may remain uncharged until a signal is received by the signaling device control circuitry 520 to activate the signaling device 114. The energy storage device charging circuitry 612 may charge the one or more energy storage devices 610 in response to receiving a signal that the signaling device 114 is to be activated. In certain implementations, there may be a delay between the time that input is received at the A/V doorbell 102 to activate the signaling device 114 and the time that the signaling device 114 produces sound. In illustrative examples, the delay may be from about 0.5 seconds to about 3 seconds. In particular illustrative examples, the delay may be from about 1 second to about 2 seconds. During the delay from the time that input is received at the A/V doorbell 102 to activate the signaling device 114 and the time that the signaling device 114 produces sound, the energy storage device charging circuitry 612 may charge the one or more energy storage devices 610. The one or more energy storage devices 610 may then discharge to supply the signaling device 114 with an amount of power to produce sound.

The arrangement 600 may also include a current sensing component 614 and current source control circuitry 616. The current sensing component 614 may detect a current on a line between the second node 516 and a node included in parallel circuitry of the A/V doorbell 102, such as the third node 522 of the second parallel circuitry 502 of FIG. 5. In illustrative implementations, the current sensing component 614 may include an impedance device, such as a resistor, and the current source control circuitry 616 may include an operational amplifier (op-amp). In particular implementations, the current source control circuitry 616 may detect that the current detected by the current sensing component 614 is above a threshold current and send a signal to a gate of a transistor that comprises the current source 602. The signal sent by the current source control circuitry 616 to the gate of a transistor that comprises the current source 602 may cause the gate to open or close. The opening or closing of the gate of a transistor that comprises the current source 602 may cause the amount of current in the first branch 512 and the second branch 514 to be modified. In various implementations, the current sensing component 614 and the current source control circuitry 616 may be included in pulse width modulation (PWM) circuitry to control the operation of the current source 602.

In certain illustrative examples, an amount of current detected by the current sensing component 614 may increase due to current being drawn by the second current shunting circuitry 530 of FIG. 5. In particular implementations, the second current shunting circuitry 530 may draw current in situations where the A/V doorbell 102 receives input to activate the signaling device 114 and the signaling device 114 is a mechanical signaling device. In these situations, power may need to be diverted from the A/V doorbell 102 to the signaling device 114, such that the signaling device 114 has sufficient power to produce sound. The increased current detected by the current sensing component 614 may trigger the current source control circuitry 616 to send a signal to the current source 602 to increase the impedance of the current source 602 and decrease the amount of current in the first branch 512. Accordingly, the amount of current in the second branch 514 may increase in order to increase the amount of power available to the signaling device 114. After a period of time for activation of the signaling device 114, the amount of current detected by the current sensing component 614 may drop below the threshold level and the current source control circuitry 616 may discontinue sending a signal to the current source 602 to increase the impedance of the current source 602.

Further, in various implementations, the arrangement 600 may include a rectifier 618 connected to the boost buck circuitry 604. The rectifier 618 converts AC power from the transformer 506 to DC power for the signaling device control circuitry 520. In particular implementations, the rectifier 618 may be a bridge rectifier comprising a plurality of diodes. In addition, although the rectifier 618 is shown in the illustrative implementation of FIG. 6 as being external to the boost buck circuitry 604, in other implementations, the rectifier 618 may be included in the boost buck circuitry 604.

Figure 7:
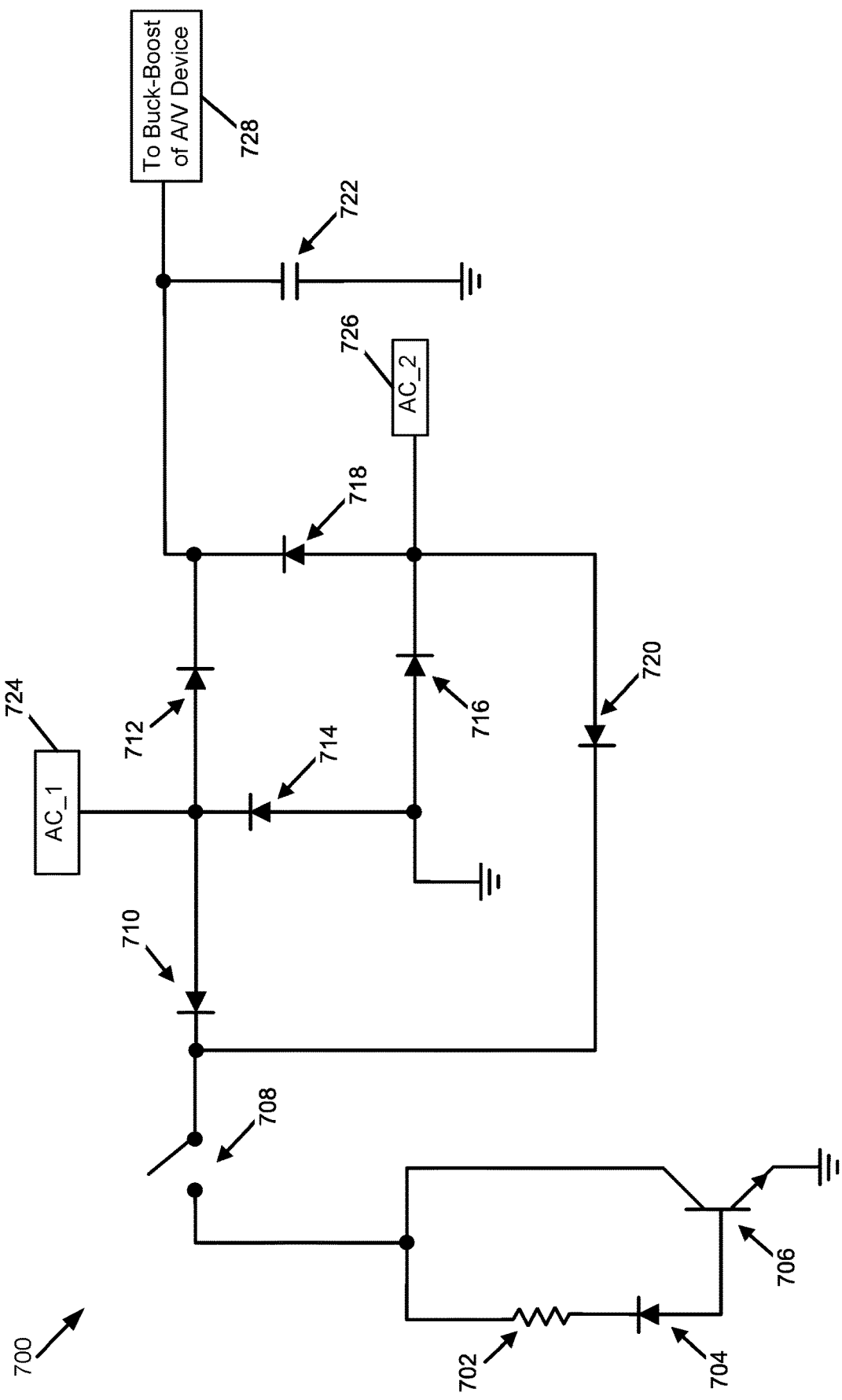
FIG. 7 is a schematic diagram illustrating circuitry to control power to an A/V doorbell according to various aspects of the present disclosure.

FIG. 7 is a schematic diagram of circuitry 700 to control power to an A/V doorbell 102 according to various aspects of the present disclosure. In various implementations, the circuitry 700 may be included in the power control circuitry 124 (FIG. 1). The circuitry 700 may include a resistor 702 coupled to a diode 704 and a transistor 706. The diode 704 may be a Zener diode and the transistor 704 may include a negative-positive-negative (npn) type transistor. In particular implementations, the transistor 704 may include a npn bi-polar junction transistor. The resistor 702, the diode 704, and the transistor 706 may, in certain implementations, be included in the second current shunting circuitry 530. The resistor 702, the diode 704, and the transistor 706 may be coupled to a switch 708 that controls the flow of current to and/or from the resistor 702, the diode 704, and the transistor 706.

The circuitry 700 may also include a number of diodes, such as a first diode 710, a second diode 712, a third diode 714, a fourth diode 716, a fifth diode 718, and a sixth diode 720. In certain implementations, the second diode 712, the third diode 714, the fourth diode 716, and the fifth diode 718 may operate as AC to DC converter circuitry. The circuitry 700 may also include a capacitor 722 and the first diode 710 and the second diode 720 may operate to keep the capacitor 722 charged over time. The circuitry 700 may be coupled via first connector 724 and second connector 726 to an AC power source, such as the transformer 116 of FIG. 1 or the transformer 506 of FIG. 5. Additionally, in particular implementations, the circuitry 700 may be coupled via a third connector 728 to buck-boost circuitry of the A/V doorbell 102.

Figure 8:
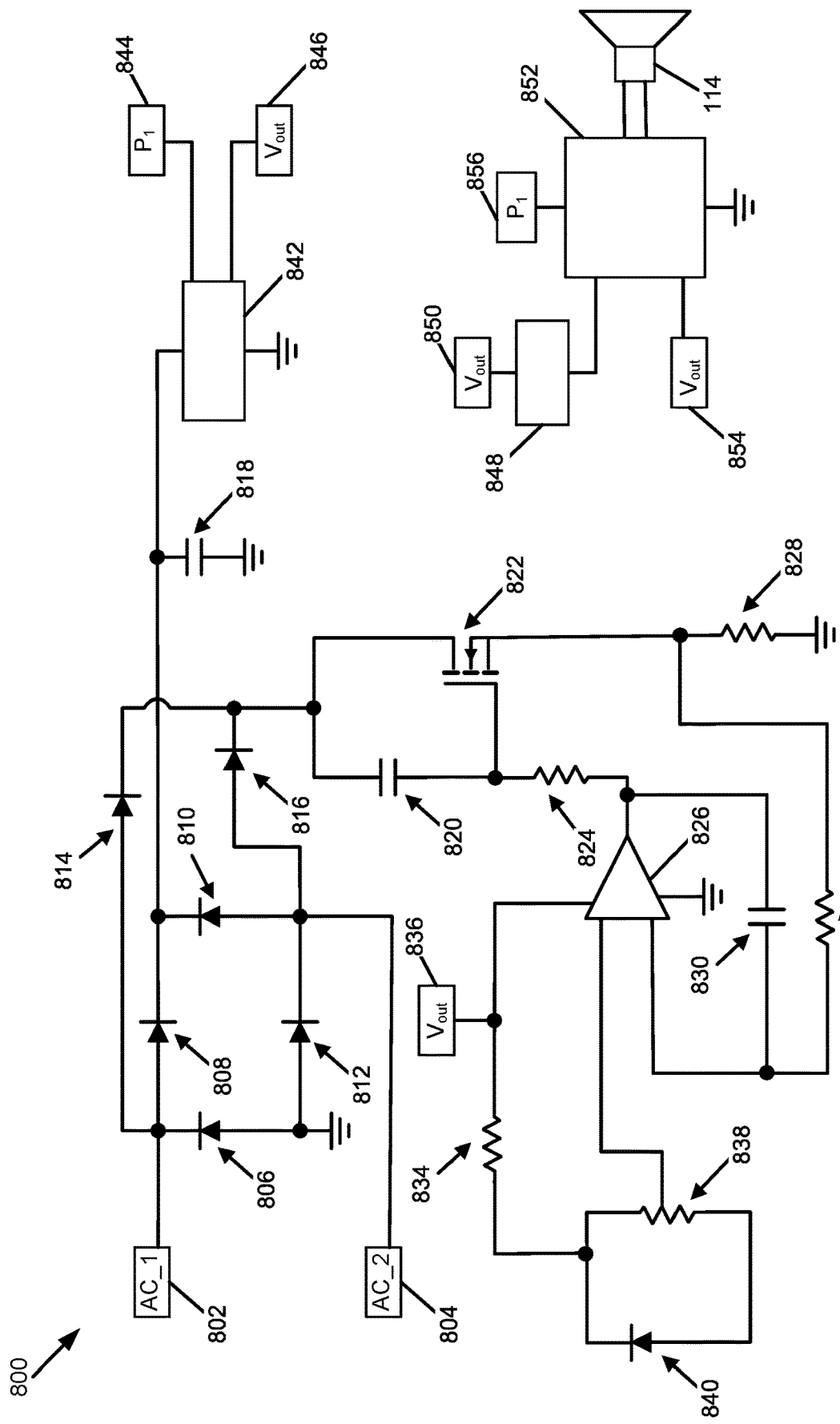
FIG. 8 is a schematic diagram illustrating circuitry to control power to a signaling device according to various aspects of the present disclosure.

FIG. 8 is a schematic diagram illustrating circuitry 800 to control power to a signaling device, according to various aspects of the present disclosure. The circuitry 800 includes a first connector 802 and a second connector 804 coupled to an AC power source, such as the transformer 116 of FIG. 1 or the transformer 506 of FIG. 5. The circuitry 800 may also include a first diode 806, a second diode 808, a third diode 810, and a fourth diode 812. The diodes 806, 808, 810, 812 may operate as an AC to DC converter, in certain implementations. In addition, the circuitry 800 may include a fifth diode 814 and a sixth diode 816. In particular implementations, the fifth diode 814 and the sixth diode 816 may control an amount of charge held by a first capacitor 818.

The circuitry 800 may include a second capacitor 820 that is coupled to an N-channel MOSFET 822. Further, the circuitry 800 includes a first resistor 824 coupled to an op-amp 826. In various implementations, the op-amp 826 may provide signals to a gate of the N-channel MOSFET 822 to control an amount of resistance provided by the N-channel MOSFET 822. In particular implementations, the op-amp 826 may provide signals to the gate of the N-channel MOSFET 822 based at least partly on a resistance of the first resistor 824. The circuitry 800 may also include a second resistor 828, a third capacitor 830, and a third resistor 832. In the illustrative example of FIG. 8, the circuitry 800 includes a fourth resistor 834 coupled to a third connector 836 that associated with an output voltage. Additionally, the circuitry 800 includes a fifth resistor 838 and a seventh diode 840. The components 802-840 of the circuitry 800 may be included in the first current shunting circuitry 518.

The circuitry 800 may also include boost-buck converter circuitry 842 that is coupled to a fourth connector 844 and a fifth connector 846. The boost-buck converter circuitry 842 is also coupled to the current shunting circuitry comprised of components 802-840. The fourth connector 844 may be associated with a power source and a fifth connector 846 may be associated with the output voltage. The output voltage may be supplied to clock circuitry 848 via a sixth connector 850 and to H-bridge circuitry 852 via a seventh connector 854. The H-bridge circuitry 852 may also be coupled to a power source via an eighth connector 856. In the illustrative example of FIG. 5, the boost-buck converter circuitry 842 is coupled to the clock circuitry 850 and the H-bridge circuitry 852 via the connectors 844, 846. The components 842-856 may be included in the signaling device control circuitry 520 of FIG. 5 and supply power to the signaling device 114.

Figure 9:
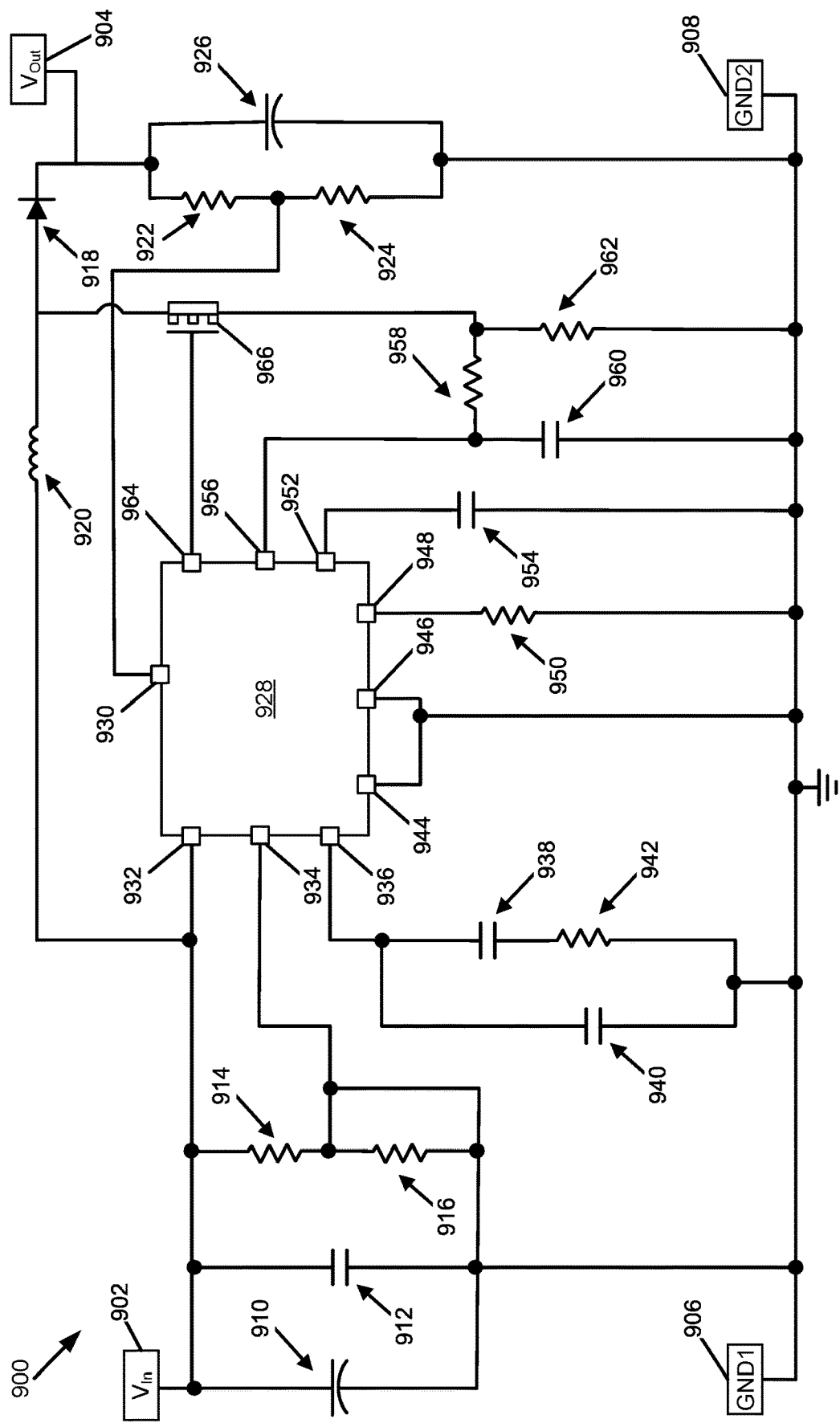
FIG. 9 is a schematic diagram illustrating an implementation of additional circuitry to control power to a signaling device according to various aspects of the present disclosure.

FIG. 9 is schematic diagram illustrating another example implementation of circuitry 900 to control power to a signaling device according to various aspects of the present disclosure. In various implementations, the circuitry 900 may be included in the signaling device control circuitry 520 of FIG. 5. The circuitry 900 may include an input voltage connector 902 and an output voltage connector 904. In addition, the circuitry 900 may include a first ground connector 906 and a second ground connector 908. The input voltage connector 902 is coupled to a first polarized capacitor 908 and a first non-polarized capacitor 910. Additionally, the input voltage connector 902 is coupled to a voltage divider comprised of a first resistor 912 and a second resistor 914. In the illustrative implementation of FIG. 9, the output voltage connector 904 is coupled to a first diode 918 and an inductor 920. Further, the output voltage connector 904 is coupled to circuitry including a third resistor 922, a fourth resistor 924, and a second polarized capacitor 926.

The circuitry 900 includes boost-buck converter circuitry 928 having a number of pins. In the illustrative implementation of FIG. 9, the boost-buck converter circuitry 928 includes a first pin 930, a second pin 932, and a third pin 934. Additionally, the boost-buck converter circuitry 928 includes a fourth pin 936 coupled to a second non-polarized capacitor 938, a third non-polarized capacitor 940, and a fifth resistor 942. Further, the boost-buck converter circuitry 928 includes a fifth pin 944 and a sixth pin 946 coupled to ground. The boost-buck converter circuitry 900 also includes a seventh pin 948 coupled to a sixth resistor 950 and an eighth pin 952 coupled to a fourth non-polarized capacitor 954. The boost-buck converter circuitry 928 also includes a ninth pin 956 coupled to circuitry having a seventh resistor 958, a fifth non-polarized capacitor 960, and an eighth resistor 962. In addition, the boost-buck converter circuitry 928 includes a tenth pin 964 coupled to an N-channel MOSFET 966.

Figure 10:
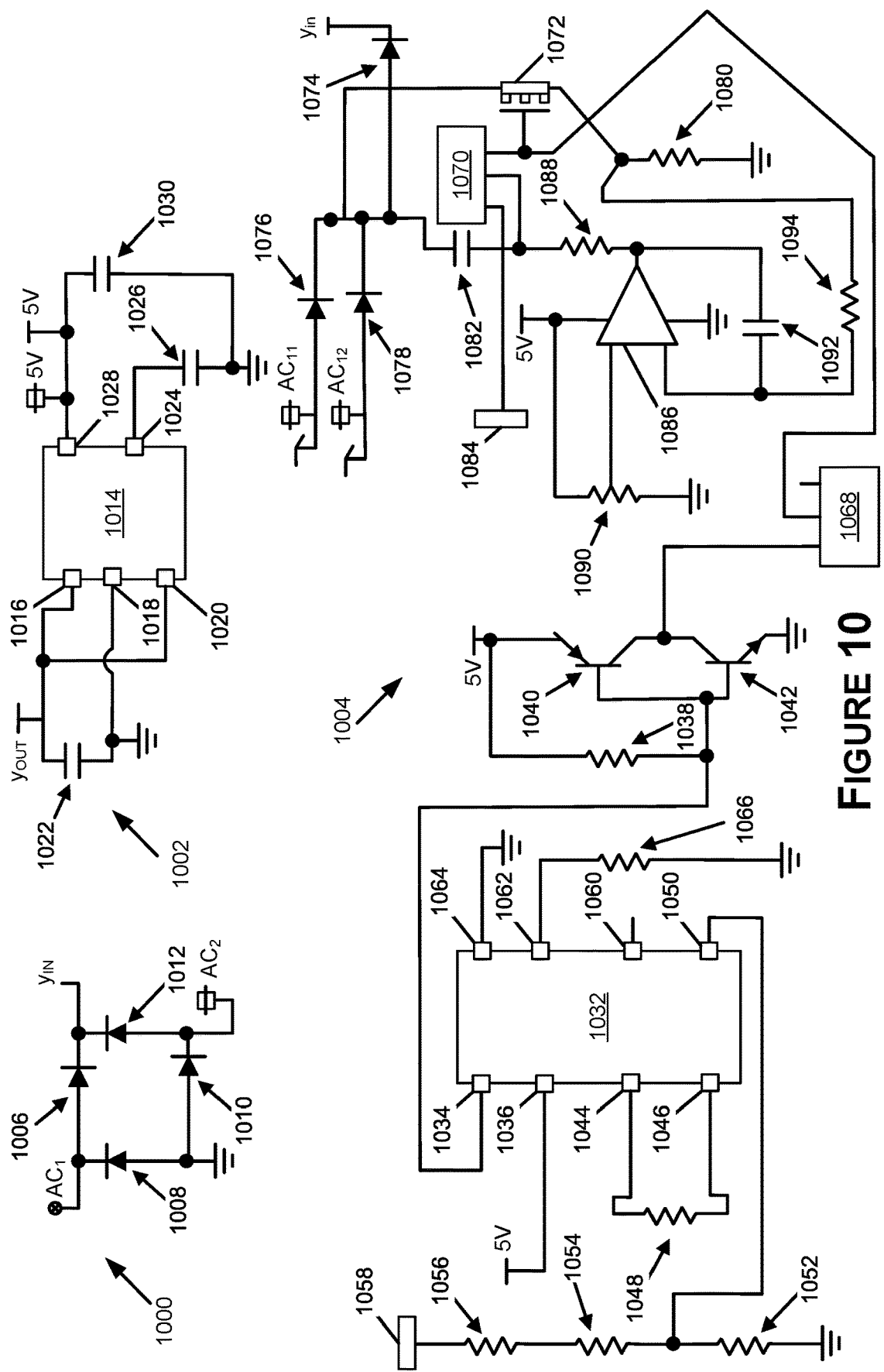
FIG. 10 is a schematic diagram illustrating an implementation of further circuitry to control power to a signaling device according to various aspects of the present disclosure.

FIG. 10 is schematic diagram illustrating an additional implementation of first circuitry 1000, second circuitry 1002, and third circuitry 1004 to control power to a signaling device according to various aspects of the present disclosure. In particular implementations, the circuitry 1000 may be part of the signaling device control circuitry 520 of FIG. 5. The first circuitry 1000 may include a first diode 1006, a second diode 1008, a third diode 1010, and a fourth diode 1012. The diodes 1006, 1008, 1010, and 1012 may operate as an AC to DC converter.

The second circuitry 1002 includes low dropout (LDO) regulator circuitry 1014. The LDO regulator circuitry 1014 may include a first pin 1016, a second pin 1018, and a third pin 1020. At least one of the first pin 1016, the second pin 1018, or the third pin 1020 may be coupled to a first capacitor 1022. The LDO regulator circuitry 1014 also includes a fourth pin 1024 coupled to a second capacitor 1026 and a fifth pin 1028 coupled to a third capacitor 1030.

The third circuitry 1004 includes pulse width modulation circuitry 1032 having a number of pins, such as a first pin 1034 and a second pin 1036. The first pin 1034 is coupled to circuitry including a first resistor 1038, a positive-negative-positive (pnp) bipolar junction transistor 1040, and a npn bipolar junction transistor 1042. Additionally, the pulse width modulation circuitry 1032 includes a third pin 1044 and a fourth pin 1046 coupled to a second resistor 1048. Further, the pulse width modulation circuitry 1032 includes a fifth pin 1050 coupled to voltage divider circuitry including a third resistor 1052, a fourth resistor 1054, and a fifth resistor 1056. The fifth resistor 1056 is coupled to a first connector 1058. The pulse width modulation circuitry 1032 also includes a sixth pin 1060, a seventh pin 1062, and an eighth pin 1064. The seventh pin 1062 is coupled to a sixth resistor 1066.

In addition, the third circuitry 1004 includes a first controller 1068 that is coupled to the components coupled to the pulse width modulation circuitry 1032 and coupled to a second controller 1070 and to a gate of an N-channel MOSFET 1072. The N-channel MOSFTE 1072 is coupled to a first diode 1074, a second diode 1076, and a third diode 1078. Further, the N-channel MOSFET 1072 is coupled to a seventh resistor 1080. The second controller 1070 is also coupled to a fourth capacitor 1082 and a connector 1084. The third circuitry 1004 also includes an op-amp 1086 that is coupled to an eighth resistor 1088 and a ninth resistor 1090. Additionally, the op-amp 1086 is coupled to a fifth capacitor 1092 and a tenth resistor 1094. In particular implementations, the op-amp 1086 may provide signals to a gate of the N-channel MOSFET 1072 to control a resistance of the N-channel MOSFET 1072. In certain implementations, the op-amp 1086 may send signals to the gate of the N-channel MOSFET 1072 based at least partly on current detected by the eighth resistor 1088.

Figure 11:
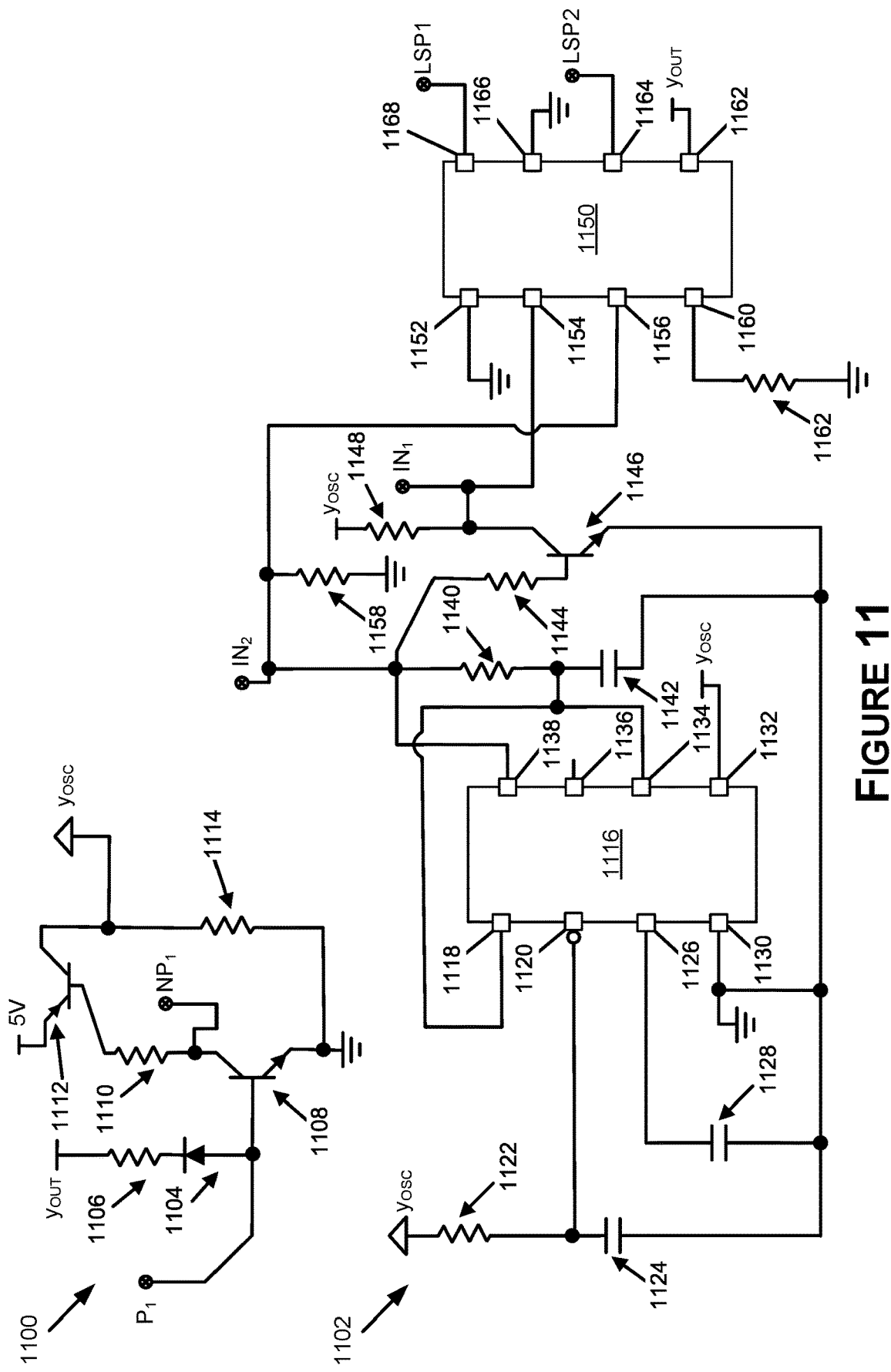
FIG. 11 is schematic diagram illustrating another implementation of still additional circuitry to control power to a signaling device according to various aspects of the present disclosure.

FIG. 11 is a schematic diagram illustrating further implementations of first circuitry 1100 and second circuitry 1102 to control power to a signaling device according to various aspects of the present disclosure. The first circuitry 1100 includes a diode 1104 coupled to a first resistor 1106. In particular implementations, the diode 1104 may include a Zener diode. Additionally, the diode 1104 is coupled to a first transistor 1108. In various implementations, the first transistor 1108 may include an npn transistor and the diode 1104 may be coupled to a base of the first transistor 1108. The first transistor 1108 is coupled to a second resistor 1110. In implementations where the first transistor 1108 is an npn transistor, the second resistor 1110 may be coupled to a collector of the first transistor 1108. Further, the second resistor 1110 is coupled to a second transistor 1112. In certain implementations, the second transistor 1112 may include a pnp transistor and the second resistor 1110 may be coupled to a base of the pnp transistor. The first circuitry 1100 also includes a third resistor 1114.

The second circuitry 1102 includes timer circuitry 1116 that includes a number of pins coupled to additional components of the second circuitry 1102. In particular implementations, the timer circuitry 1116 may be part of the clock circuitry 608 of FIG. 6. The timer circuitry 1116 includes a first pin 1118 and a second pin 1120. The second pin 1120 is coupled to a first resistor 1122 and a first capacitor 1124. The timer circuitry 1116 also includes a third pin 1126 coupled to a second capacitor 1128 and a fourth pin 1130. Additionally, the timer circuitry 1116 includes a fifth pin 1132, a sixth pin 1134, a seventh pin 1136, and an eighth pin 1138. In the illustrative implementation of FIG. 11, the first pin 1118 and the sixth pin 1136 are coupled to a node that is coupled to second resistor 1140 and a third capacitor 1142. Further, the eighth pin 1138 is coupled to a third resistor 1144 that is coupled to a transistor 1146. The transistor 1146 is also coupled to a fourth resistor 1148. In particular implementations, the transistor 1146 may be an npn transistor and the third resistor 1144 may be coupled to a base of the transistor 1146 and the fourth resistor 1148 may be coupled to a collector of the transistor 1146.

The second circuitry 1102 also includes H-bridge circuitry 1150. In various implementations, the H-bridge circuitry 1150 may be included in the H-bridge circuitry 606 of FIG. 6. The H-bridge circuitry 1150 includes a first pin 1152, a second pin 1154, and a third pin 1156. The third pin is coupled to a fifth resistor 1158. The H-bridge circuitry 1150 also includes a fourth pin 1160 couple to a sixth resistor 1162. Additionally, the H-bridge circuitry 1150 includes a fifth pin 1162, a sixth pin 1164, a seventh pin 1166, and an eighth pin 1168, which are individually coupled to a respective connector or ground.

Figure 12:
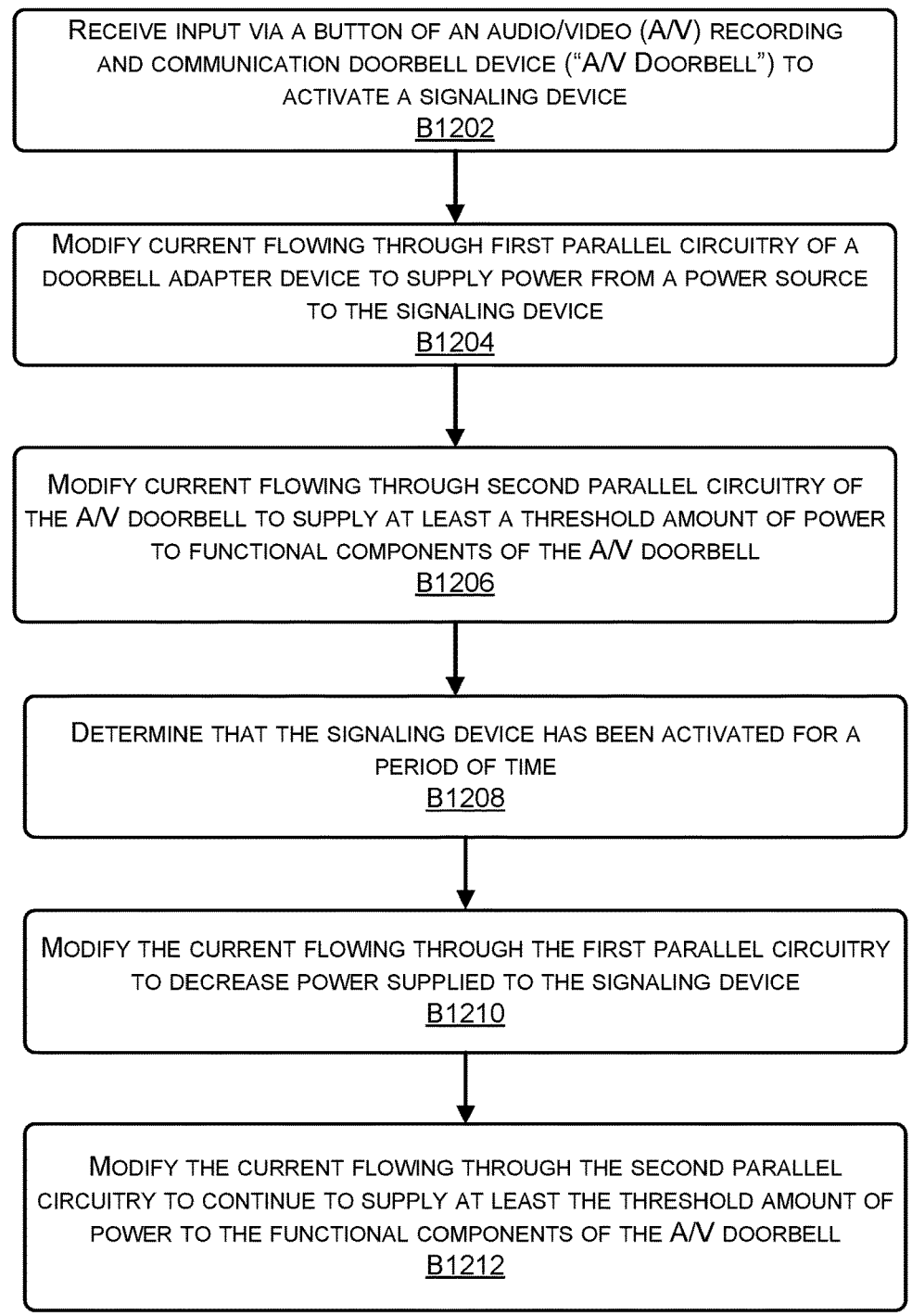
FIG. 12 is a flowchart illustrating an example process for powering an A/V doorbell and a signaling device contemporaneously without a backup power source according to various aspects of the present disclosure.

FIG. 12 is a flowchart illustrating a first example process 1200 for powering an A/V doorbell 102, 210 and a signaling device 114 contemporaneously without a backup power source according to various aspects of the present disclosure. The process 1200, at block B1202, includes receiving input via a button 306 of an A/V doorbell 102, 210 to activate the signaling device 114. In various implementations, the signal may be received by a doorbell adapter device 120 and a switch of the doorbell adapter device 120 may operate to divert power to the signaling device 114 and away from the A/V doorbell 102, 210. The electrical switch may be part of doorbell power circuitry of a structure 104 to which the A/V doorbell 102, 210 is attached. The doorbell power circuitry may include a power source 508 that is coupled to a transformer 116, 506. The button 306 may be a physical button disposed on the A/V doorbell 102, 210 and/or a button displayed on a user interface of the A/V doorbell 102, 210.

The process 1200, at block B1204, includes modifying current flowing through first parallel circuitry 502 of a doorbell adapter device 120 to supply power from the power source 508 to the signaling device 114. The first parallel circuitry 502 may include a first branch 512 having first shunting circuitry 518 and a second branch 514 coupled to the signaling device 114. In situations where the signaling device 114 is a mechanical signaling device, the current flowing through the first parallel circuitry 502 may be modified by the first current shunting circuitry 518 operating to decrease the current flowing through the first branch 512, resulting in an increase in the current flowing through the second branch 514. In additional scenarios where the signaling device 114 is a digital signaling device, the current flowing through the first parallel circuitry 502 may be modified by the first current shunting circuitry 518 operating to increase the current flowing through the first branch 512, resulting in a decrease in the current flowing through the second branch 514. In various implementations, the amount of current flowing through the individual branches 512, 514 of the first parallel circuitry 502 may differ for mechanical signaling devices and digital signaling devices, because the power requirements to activate mechanical signaling devices and digital signaling devices may differ. For example, the power requirement for a mechanical signaling device may range from 10 W to 30 W and the power requirement for a digital signaling device may range from 2 W to 5 W. Thus, the first parallel circuitry 502 and also second parallel circuitry 504 may direct the flow of current to power the signaling device 114 and the A/V doorbell 102, 210 without a backup power source.

The process 1200, at block B1206, includes modifying current flowing through second parallel circuitry 504 of the A/V doorbell 102, 210 to supply at least a threshold amount of power to functional components 122 of the A/V doorbell 102, 210. The second parallel circuitry 504 may include a first branch 524 having second current shunting circuitry 530 and a second branch 526 coupled to the A/V doorbell 102, 210. In situations where the signaling device 114 is a mechanical signaling device, second current shunting circuitry 530 may operate to increase the amount of current flowing through the first branch 524 of the second parallel circuitry 504, resulting in a decrease in current flowing through the second branch 526 of the second parallel circuitry 504. Additionally, in scenarios where the signaling device 114 is a digital signaling device, the second current shunting circuitry 530 may operate to increase the amount of current flowing through the first branch 524 of the second parallel circuitry 504, resulting in a decrease in the amount of current flowing through the second branch 526 of the second parallel circuitry 504. In implementations where the signaling device 114 is a digital signaling device, the voltage and/or power requirements for the signaling device 114 may be less than the voltage and/or power requirements of the A/V doorbell 102, 210. Since the voltage provided to components connected in series corresponds to the component having the lowest voltage and/or power requirement, the second shunting circuitry 530 may decrease the current flow to the A/V doorbell 102, 210 to match the power supplied to the A/V doorbell 102, 210 and the power supplied to the digital signaling device. In scenarios where the amount of current flowing through the second branch 526 of the second parallel circuitry 504 does not supply sufficient power for the functional components 122 of the A/V doorbell 102, 210, boost converter circuitry of the A/V doorbell 102, 210 may increase the power supplied to the functional components 122 such that at least the threshold amount of power is supplied to the A/V doorbell 102, 210.

The process 1200, at block B1208, includes determining that the signaling device 114 has been activated for a period of time. In particular implementations, the amount of time that the signaling device is activated may be based on input provided by an individual 110 associated with the structure 104 indicating an amount of time for the signaling device 114 to produce sound. In certain implementations, the A/V doorbell 102, 210 may send a signal to the doorbell adapter device 120 for a period of time to cause the signaling device 114 to be activated for the period of time.

The process 1200, at block B1210, includes modifying the current flowing through the first parallel circuitry 502 to decrease power supplied to the signaling device 114. After the signaling device 114 has been activated and produced sound for a period of time, the first parallel circuitry 502 may operate to decrease the current flowing to the signaling device 114 because the power requirements of the signaling device 114 may decrease. That is, since the signaling device 114 is no longer activated to produce sound, the signaling device 114 may no longer need power. In particular implementations, the first current shunting circuitry 518 of the first parallel circuitry 502 may increase the current flowing through the first branch 512 of the first parallel circuitry 502, resulting in a decrease in current flowing through the second branch 514 of the first parallel circuitry 502. In particular implementations, a switch included in the doorbell adapter device 120 may operate to divert power away from the signaling device 114 and make an additional amount of power available to the A/V doorbell 102.

The process 1200, at block B1212, includes modifying current flowing through the second parallel circuitry 504 to continue to supply at least the threshold amount of power to the functional components 122 of the A/V doorbell 102, 210. In certain implementations, as additional power is made available to the A/V doorbell 102, 210, the amount of current flowing through the second branch 526 of the second parallel circuitry 504 may increase.

Figure 13:
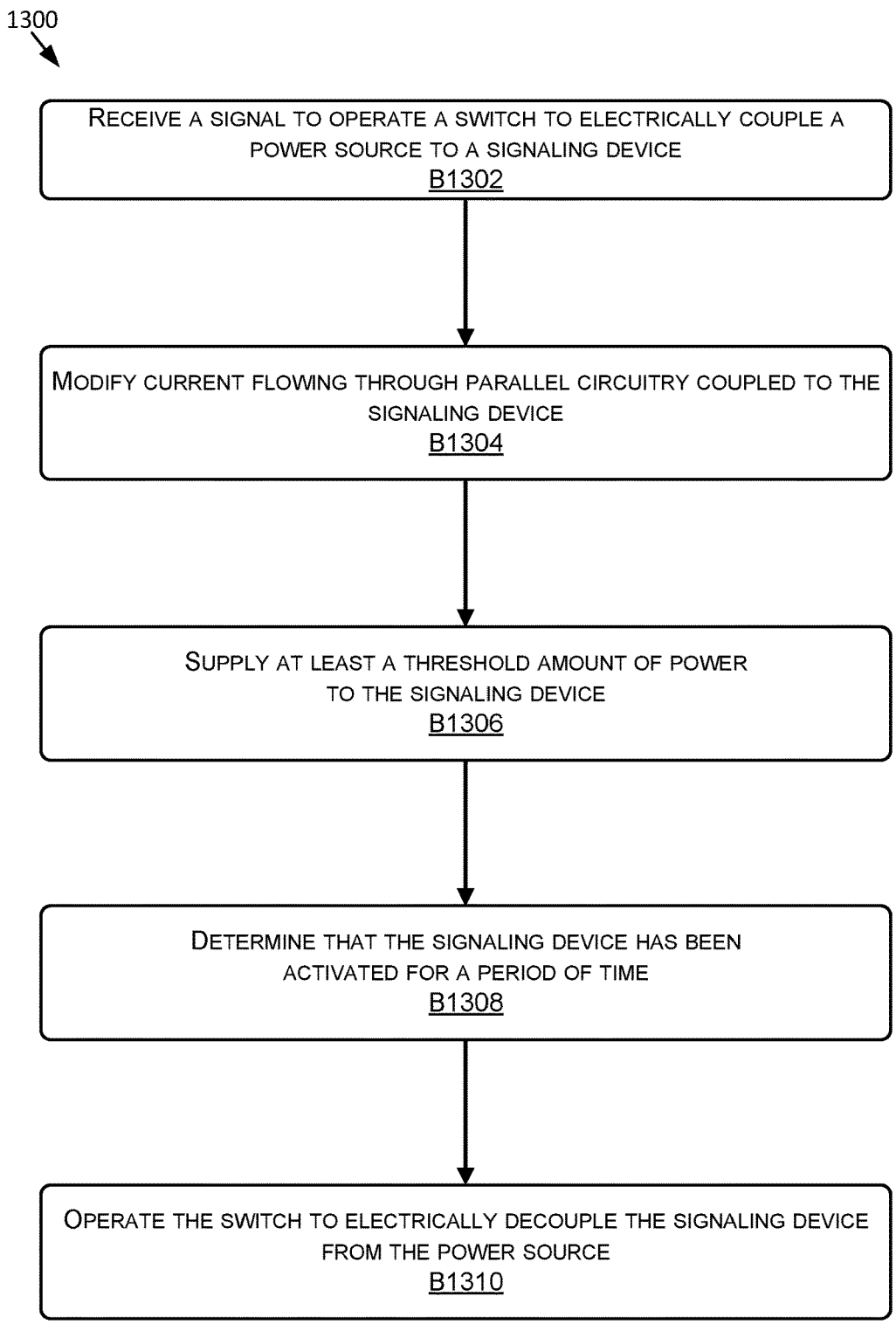
FIG. 13 is a flowchart illustrating an example process for powering a signaling device in response to input to activate the signaling device according to various aspects of the present disclosure.

FIG. 13 is a flowchart illustrating a second example process 1300 for powering a signaling device 114 in response to input to activate the signaling device 114 according to various aspects of the present disclosure. The process 1300, at block B1302, includes receiving a signal to operate a switch to electrically couple a power source 506 to a signaling device 114. In particular implementations, the switch may be included in a doorbell adapter device 120 that is coupled to the signaling device 114. The switch may operate to electrically couple the power source 506 to the signaling device 114 in response to a signal received from an A/V doorbell 102, 210.

The process 1300, at block B1304, includes modifying current flowing through parallel circuitry 502 coupled to the signaling device 114. In particular implementations, current shunting circuitry 518 in a first branch 512 of the parallel circuitry 502 may operate to increase the current flowing in a second branch 514 of the parallel circuitry 502 that is coupled to the signaling device 514. In various implementations, the current shunting circuitry 518 may include a MOSFET and a gate of the MOSFET may be coupled to a current sensing component 614. The current sensing component 614 may be coupled to the parallel circuitry 502 and detect an amount of current flowing out of or in to the parallel circuitry 502. In situations where the current sensing component 614 detects a threshold amount of current, an operational amplifier coupled between the current sensing component 614 and the MOSFET may send a signal to the gate of the MOSFET to cause the MOSFET to decrease the amount of current flowing in the first branch 512 of the parallel circuitry, resulting in an increase of current flowing through the second branch 514. In additional implementations, the current shunting circuitry 518 may operate to decrease the amount of current flowing in the second branch 512 of the parallel circuitry 502. In various implementations, the current shunting circuitry 518 may operate to increase the amount of current flowing in the second branch 514 of the parallel circuitry 502 when the signaling device 114 is a mechanical signaling device and the current shunting circuitry 518 may operate to decrease the amount of current flowing in the second branch 514 of the parallel circuitry 502 when the signaling device 114 is a digital signaling device.

The process 1300, at block B1306, includes supplying at least a threshold amount of power to the signaling device 114. That is, the current flowing through the first branch 512 and the second branch 514 of the parallel circuitry 502 may result in at least the threshold amount of power being supplied to the signaling device 114. In certain implementations, supplying at least the threshold amount of power to the signaling device 114 may include activating boost converter circuitry of the doorbell adapter device 120 coupled to the signaling device 114. In situations where the current flowing through the second branch 514 is not sufficient to supply the threshold amount of power to the signaling device 114, the boost converter circuitry may be activated to increase the amount of power supplied to the signaling device. In various implementations, the threshold amount of power may correspond to an amount of power to cause the signaling device 114 to produce sound.

The process 1300, at block B1308, includes determining that the signaling device 114 has been activated for a period of time, and the process 1300, at block 1310 includes operating the switch to electrically decouple the signaling device 114 from the power source 506. In certain implementations, after the period of time, the signal to activate the signaling device 114 may be terminated. For example, the A/V doorbell 102, 210 may send a signal to the signaling device 114 for the period of time and the signaling device 114 may be configured to produce sound during the period of time that the signal is received. In particular implementations, the signaling device 114 may include a mechanical signaling device that produces sound for an amount of time that corresponds to a length of time that a signal is received from the A/V doorbell 102. In other situations, the signaling device 114 may receive a signal from the A/V doorbell 102, 210 to produce sound and the signaling device 114 may be activated for a predetermined period of time. In illustrative examples, the signaling device 114 may be a digital signaling device that produces sound for a predetermined period of time and is activated by a signal from the A/V doorbell 102, 210.

Figure 14:
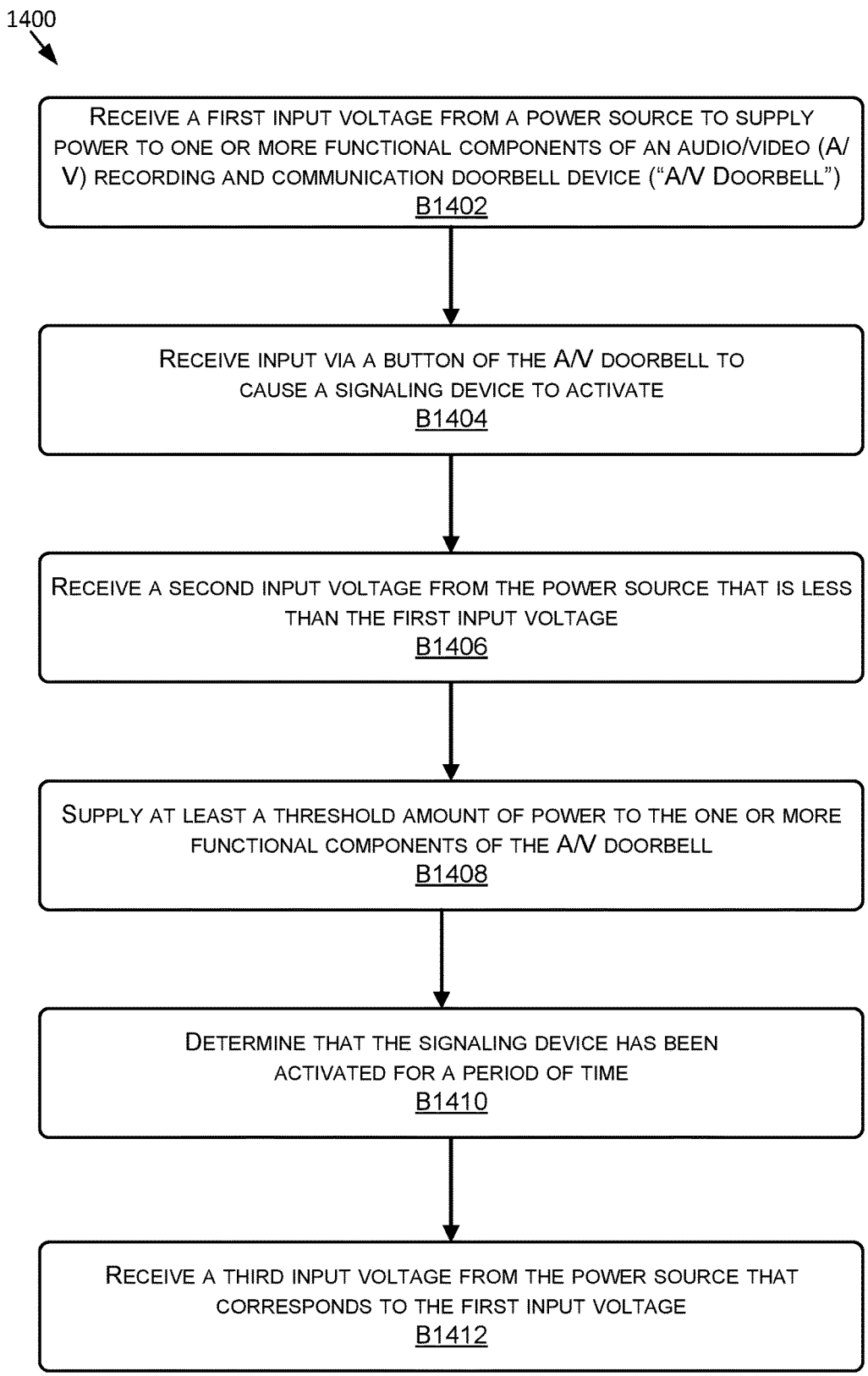
FIG. 14 is a flowchart illustrating an example process for powering an A/V doorbell without a backup power source during activation of a signaling device according to various aspects of the present disclosure.

FIG. 14 is a flowchart illustrating an example process 1400 for powering an A/V doorbell 102, 210 without a backup power source during activation of a signaling device 114 according to various aspects of the present disclosure. The process 1400, at block B1402, includes receiving a first input voltage from a power source 506 to supply power to one or more functional components 122 of an A/V doorbell 102, 210. In particular implementations, when the signaling device 114 is not activated, the signaling device 114 may be electrically decoupled from the power source 506 via one or more components, such as a switch. In certain implementations, the switch may include a relay. In additional implementations, the switch may include a transistor. The first input voltage may correspond to a voltage supplied to the A/V doorbell 102, 210 when power from the power source 506 is not being shared between the A/V doorbell 102, 210 and another component included in doorbell power circuitry of the structure 104, such as the signaling device 114. The first input voltage may be sufficient to power the functional components 122 of the A/V doorbell 102, 210.

The process 1400, at block B1404, includes receiving input via a button 306 of an A/V doorbell 102, 210 to cause a signaling device 114 to activate. In response to the input, the A/V doorbell 102, 210 may send a signal to the signaling device 114 to cause the signaling device 114 to be activated and produce sound.

The process 1400, at block B1406, includes receiving a second input voltage from the power source 506 that is less than the first input voltage. In particular implementations, as power from the power source 506 is shared between the signaling device 114 and the A/V doorbell 102, 210, the input voltage received by the A/V doorbell 102, 210 may decrease from the first input voltage to the second input voltage.

The process 1400, at block B1408, includes supplying at least a threshold amount of power to the one or more functional components 122 of the A/V doorbell 102, 210. In certain implementations, boost converter circuitry of the A/V doorbell 102, 210 may be activated to increase the amount of power supplied to the one or more functional components 122 of the A/V doorbell 102, 210. In various implementations, shunting circuitry 530 may control the amount of current supplied to the A/V doorbell 102, 210 to supply at least the threshold amount of power to the one or more functional components 122.

The process 1400, at block 1410 includes determining that the signaling device 114 has been activated for a period of time and, the process 1400, at block 1412 includes receiving a third input voltage from the power source that corresponds to the first input voltage. In various implementations, after power from the power source 506 has been diverted to the signaling device 114 to produce sound for the period of time, the signaling device 114 may be electrically decoupled from the power source 506 and additional power may become available to the A/V doorbell 102, 210. In these situations, the input voltage received by the A/V doorbell 102, 210 may increase to the third input voltage. In certain implementations, the third input voltage may be substantially the same as the first input voltage. Further, current shunting circuitry 530 and power management circuitry 532 may operate to control the flow of current through the parallel circuitry 504 that includes the A/V doorbell 102, 210 and the input voltage received by the A/V doorbell 102, 210, such that the input voltage received by the A/V doorbell 102, 210 is sufficient to power the one or more functional components 122, but is also within an operating voltage of the one or more functional components 122. That is, the current shunting circuitry 530 and the power management circuitry 532 may cause an input voltage received by A/V doorbell 102 to be sufficient to power the one or more functional components 122, but be less than a voltage that may be too high and cause damage to the one or more functional components 122.

Figure 15:
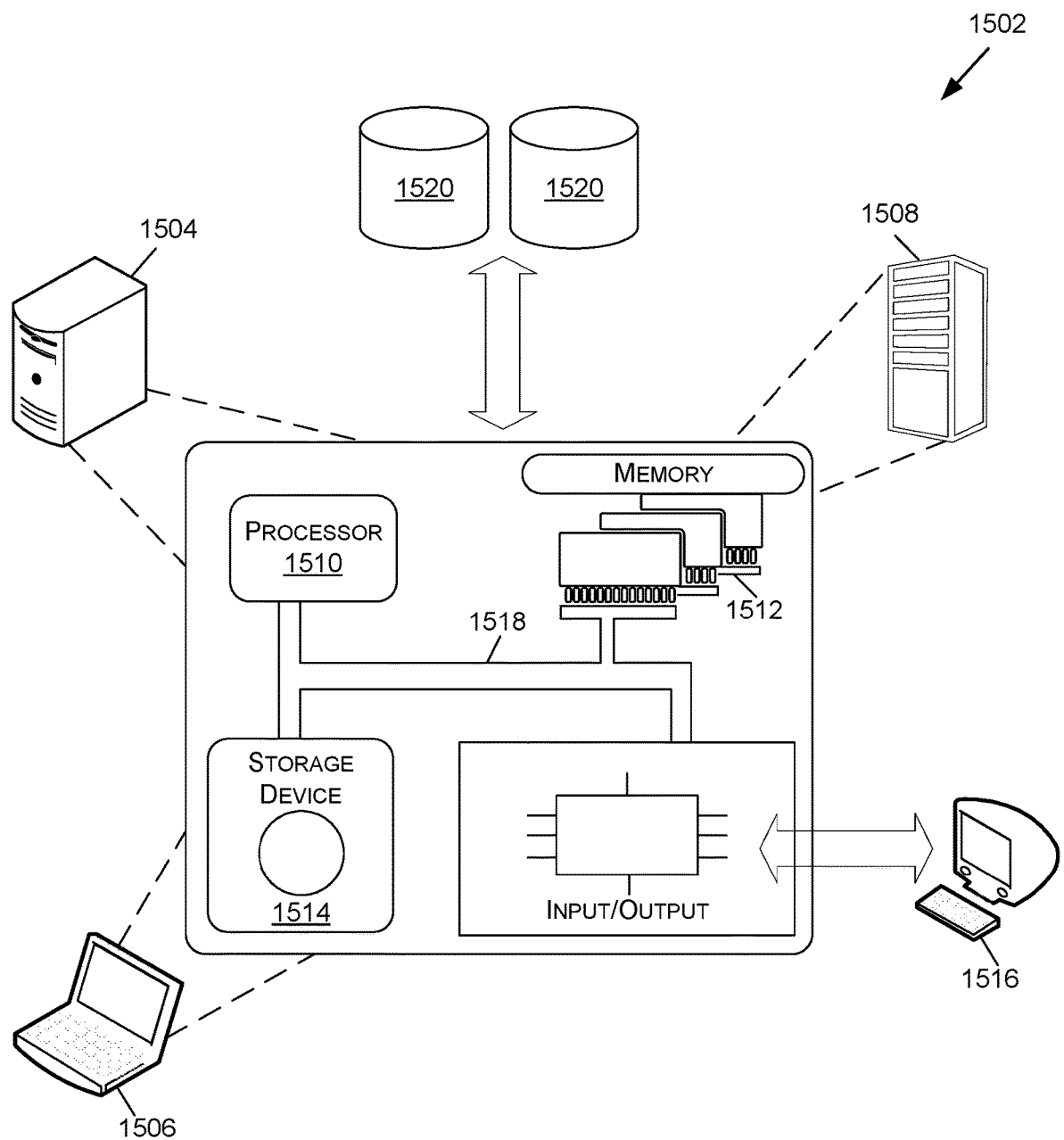
FIG. 15 is a functional block diagram of a general-purpose computing system on which the present implementations may be implemented according to various aspects of the present disclosure.

FIG. 15 is a functional block diagram of a general-purpose computing system on which the present implementations may be implemented according to various aspects of the present disclosure. The computer system 1502 may be embodied in at least one of a personal computer (also referred to as a desktop computer) 1504, a portable computer (also referred to as a laptop or notebook computer) 1506, and/or a server 1508 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1502 may execute at least some of the operations described above. The computer system 1502 may include at least one processor 1510, memory 1512, at least one storage device 1514, and input/output (I/O) devices 1516. Some or all of the components 1510, 1512, 1514, 1516 may be interconnected via a system bus 1518. The processor 1510 may be single- or multi-threaded and may have one or more cores. The processor 1510 execute instructions, such as those stored in the memory 1512 and/or in the storage device 1514. Information may be received and output using one or more I/O devices 1516.

The memory 1512 may store information, and may be a computer-readable medium, such as volatile or non-volatile memory. The storage device(s) 1514 may provide storage for the system 1502 and, in some implementations, may be a computer-readable medium. In various aspects, the storage device(s) 1514 may be a flash memory device, a hard disk device, an optical disk device, a tape device, or any other type of storage device.

The I/O devices 1516 may provide input/output operations for the system 1502. The I/O devices 1516 may include a keyboard, a pointing device, and/or a microphone. The I/O devices 1516 may further include a display unit for displaying graphical user interfaces, a speaker, and/or a printer. External data may be stored in one or more accessible external databases 1520.

The features of the present implementations described herein may be implemented in digital electronic circuitry, and/or in computer hardware, firmware, software, and/or in combinations thereof. Features of the present implementations may be implemented in a computer program product tangibly embodied in an information carrier, such as a machine-readable storage device, and/or in a propagated signal, for execution by a programmable processor. Implementations of the present method steps may be performed by a programmable processor executing a program of instructions to perform functions of the described implementations by operating on input data and generating output.

The features of the present implementations described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present implementations may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present implementations may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present implementations, and of the manner and process of practicing them, in such full, clear, concise, and exact terms as to enable any person skilled in the art to which they pertain to practice these implementations. The present implementations are, however, susceptible to modifications and alternate constructions from those discussed above that are fully equivalent. Consequently, the present invention is not limited to the particular implementations disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative implementations be performed concurrently. Likewise, steps that have been presented as being performed concurrently may in alternative implementations be performed separately.

In a first aspect, a system comprises: a doorbell adapter device having first and second terminals for coupling to a signaling device that produces sound and for coupling to doorbell power circuitry having a power source, the doorbell adapter device comprising: a first current source configured to draw a first amount of current from the power source; signaling device control circuitry in parallel with the first current source creating a first parallel circuit, the signaling device control circuitry configured to supply power to the signaling device to cause the signaling device to produce the sound; a current sensor coupled to the parallel circuit and configured to detect a second amount of current flowing from the first parallel circuit; and current source control circuitry coupled between the first current source and the current sensor, the current source control circuitry configured to send a control signal to the first current source to cause the first current source to modify the first amount of current based at least in part on the second amount of current; and an audio/video (A/V) recording and communication doorbell device ("A/V doorbell") coupled to the doorbell adapter device, the A/V doorbell comprising: power management circuitry configured to supply an amount of power to the A/V doorbell; a second current source in parallel with the power management circuitry creating a second parallel circuit; and a button, and when the button is pressed: the second current source modifies an amount of current drawn by the second current source; and the power management circuitry modifies the amount of power supplied to the A/V doorbell.

In an implementation of the first aspect, the signaling device includes a mechanical signaling device; the current sense control circuitry detects that the second amount of current is at least a threshold current and sends a signal to the first current source to modify an amount of current drawn by the first current source from the first amount of current to a third amount of current that is less than the first amount of current; the signaling device control circuitry increases the amount of power available to the signaling device; and the second parallel circuit decreases the power available to the A/V doorbell.

In another implementation of the first aspect, the signaling device includes a digital signaling device; the first current source modifies the amount of current drawn by the first current source from the first amount of current to a third amount of current that is greater than the first amount of current; and the power management circuitry increases the power available to the A/V doorbell.

In another implementation of the first aspect, the A/V doorbell sends a signal to the doorbell adapter device in response to the input from the button; and the doorbell adapter device causes power to be diverted from the A/V doorbell to the signaling device based at least partly on the signal.

In a second aspect, a doorbell adapter device having first and second terminals for coupling to a signaling device in doorbell power circuitry having a power source, the signaling device producing sound when activated, the doorbell adapter device comprising: a parallel circuit including a first branch having a current source and a second branch having signaling device control circuitry that is coupled to the signaling device; a current sensor coupled to the parallel circuit for detecting an amount of current flowing out of the parallel circuit; and current source control circuitry that sends a control signal to the current source to cause the current source to modify a second amount of current drawn by the current source based at least in part on the amount of current.

In an implementation of the second aspect, the doorbell adapter device further comprises signaling device control circuitry coupled to the signaling device, wherein the signaling device control circuitry includes a boost-buck converter that supplies power to the signaling device based at least partly on an applied voltage across the parallel circuit.

In another implementation of the second aspect, the signaling device control circuitry includes H-bridge circuitry coupled to clock circuitry, and the H-bridge circuitry supplies a direct current (DC) signal to the signaling device for a first period of time and an alternating current (AC) signal to the signaling device for a second period of time subsequent to the first period of time.

In another implementation of the second aspect, the current source control circuitry includes an operational amplifier; the current source is a metal-oxide semiconductor field-effect transistor (MOSFET); and the control signal is sent by the operational amplifier to a gate of the MOSFET.

In another implementation of the second aspect, a power requirement for the signaling device to produce sound is from 2 W to 20 W.

In another implementation of the second aspect, the signaling device control circuitry includes one or more supercapacitors that supply power to the signaling device.

In another implementation of the second aspect, the doorbell adapter device further comprises pulse width modulation (PWM) circuitry coupled to the current source.

In another implementation of the second aspect, when the signaling device includes a mechanical signaling device: the current sensor detects that the first amount of current is at least a threshold amount of current; the current source receives the control signal from the current source control circuitry and decreases an amount of current in the first branch of the parallel circuit; and the signaling device control circuitry increases a voltage applied to the mechanical signaling device.

In another implementation of the second aspect, when the signaling device includes a digital signaling device: a voltage applied to the digital signaling device is no greater than a threshold voltage; and the current source increases an amount of current drawn by the current source.

In another implementation of the second aspect, after the signaling device has produced sound for a period of time: the current sensor detects an additional amount of current related to the parallel circuit is less than a threshold current; the current source increases the amount of current drawn by the current source from the third amount of current to the first amount of current; and the parallel circuit decreases the power available to the signaling device.

In a third aspect, an audio/visual (A/V) recording and communication doorbell device ("A/V doorbell") has first and second terminals for coupling to a signaling device in a doorbell power circuit, and the A/V doorbell comprises: a parallel circuit including a first branch having a current source and a second branch having power management circuitry, the power management circuitry supplying power to one or more functional components of the A/V doorbell; and a button; wherein when the button is pressed, the current source modifies an amount of current drawn by the current source for a period of time that corresponds to an amount of time that the signaling device is to be activated.

In an implementation of the third aspect, when a voltage applied to the signaling device is greater than a voltage applied to the A/V doorbell, the current source increases an amount of current drawn by the current source.

In another implementation of the third aspect, when a voltage applied to the signaling device being less than a voltage applied to the A/V doorbell, the current source decreases an amount of current drawn by the current source.

In another implementation of the third aspect, the power management circuitry includes boost-buck converter circuitry and the boost-buck converter circuitry increases power supplied to the A/V doorbell based at least partly on a voltage applied to the signaling device being less than a voltage applied to the A/V doorbell.

In another implementation of the third aspect, the A/V doorbell further comprises a mounting device to attach the A/V doorbell to a structure, and the one or more functional components include a camera and a wireless communication interface.

In another implementation of the third aspect, the signaling device is a digital signaling device; and after the signaling device has produced sound for a period of time: the current source decreases the amount of current drawn by the current source; and boost-buck converter circuitry of the power management circuitry discontinues supplying power to the one or more functional components of the A/V doorbell.

In a fourth aspect, a method comprises: receiving an input at an audio/video (A/V) recording and communication doorbell device ("A/V doorbell"), the A/V doorbell including a camera and a mounting device configured to mount the A/V doorbell to a structure, the A/V doorbell being coupled to a mechanical signaling device and both the A/V doorbell and the mechanical signaling device being coupled to a voltage source; based at least in part on the input: increasing power supplied to the mechanical signaling device to cause the mechanical signaling device to produce a sound by modifying first current flowing through first parallel circuitry that includes the mechanical signaling device; and decreasing power supplied to the A/V doorbell to at least a minimum threshold power by modifying second current flowing through second parallel circuitry including the A/V doorbell.

In an implementation of the fourth aspect, the first parallel circuitry has a first branch including first shunting circuitry and a second branch including the mechanical signaling device; and the second parallel circuitry has a third branch including second shunting circuitry and a fourth branch including the A/V doorbell.

In another implementation of the fourth aspect, increasing the power supplied to the mechanical signaling device includes decreasing current in the first branch of the first parallel circuitry and increasing current in the second branch of the first parallel circuitry.

In another implementation of the fourth aspect, increasing the power supplied to the mechanical signaling device includes activating boost converter circuitry coupled to the mechanical signaling device.

In another implementation of the fourth aspect, decreasing the power supplied to the A/V doorbell to at least the minimum threshold power includes increasing the current in the third branch of the second parallel circuitry.

In another implementation of the fourth aspect, a current sensor and current control circuitry are coupled between the first parallel circuitry and the second parallel circuitry, and the method further comprises: detecting, by the current sensor, that an amount of current flowing between the first parallel circuitry and the second parallel circuitry is greater than a threshold amount of current; and sending, by the current control circuitry, a signal to the first shunting circuitry to decrease the current in the first branch of the first parallel circuitry.

In another implementation of the fourth aspect, the current sensor includes a resistor, the current control circuitry includes an operational amplifier (op-amp), the first shunting circuitry includes a metal oxide semiconductor field effect transistor (MOSFET), and the signal is sent from the op-amp to a gate of the MOSFET.

In another implementation of the fourth aspect, the first shunting circuitry includes a first current source that controls the amount of current flowing through the first branch of the first parallel circuitry; and the second shunting circuitry includes a second current source that controls the amount of current flowing through the third branch of the second parallel circuitry.

In another implementation of the fourth aspect, after the mechanical signaling device has produced sound for a period of time: decreasing the power supplied to the mechanical signaling device by increasing an amount of current flowing through the first branch of the first parallel circuitry and decreasing an amount of current flowing through the second branch of the first parallel circuitry; and increasing power supplied to the A/V doorbell by decreasing an amount of current flowing through the third branch of the second parallel circuitry and increasing an amount of current flowing through the fourth branch of the second parallel circuitry.

In another implementation of the fourth aspect, a current sensor and current control circuitry are coupled between the first parallel circuitry and the second parallel circuitry, and the method further comprises: detecting, by the current sensor, that an amount of current flowing between the first parallel circuitry and the second parallel circuitry is less than a threshold amount of current; and sending, by the current control circuitry, a signal to the first shunting circuitry to increase the amount of current flowing in the first branch of the first parallel circuitry.

In another implementation of the fourth aspect, the method further comprises: in response to the input, sending, from the A/V doorbell to a doorbell adapter device coupled to the mechanical signaling device, a signal to divert power to the mechanical signaling device and away from the A/V doorbell.

In another implementation of the fourth aspect, the signal is sent to a switch included in the doorbell adapter device and the switch is configured to divert power to the mechanical signaling device and away from the A/V doorbell.

In a fifth aspect, a method comprises: receiving an input at an audio/video (A/V) recording and communication doorbell device ("A/V doorbell"), the A/V doorbell including a camera and a mounting device configured to mount the A/V doorbell to a structure, the A/V doorbell being coupled to a digital signaling device, and both the A/V doorbell and the digital signaling device being coupled to a voltage source; and based at least in part on the input: modifying first current flowing through first parallel circuitry coupled to the digital signaling device; causing the digital signaling device to produce sound; modifying second current flowing through second parallel circuitry coupled to the A/V doorbell; and increasing power supplied to the A/V doorbell.

In an implementation of the fifth aspect, increasing power provided to the A/V doorbell includes activating boost converter circuitry of the A/V doorbell to increase the power supplied to the A/V doorbell.

In another implementation of the fifth aspect, the first parallel circuitry includes a first branch having first shunting circuitry and a second branch including the digital signaling device; the second parallel circuitry includes a third branch having second shunting circuitry and a fourth branch including the A/V doorbell; modifying the first current flowing through the first parallel circuitry includes increasing current flowing through the first branch of the first parallel circuitry; and modifying the second current flowing through the second parallel circuitry includes increasing current flowing through the third branch of the second parallel circuitry.

In another implementation of the fifth aspect, the current flowing through the first branch of the first parallel circuitry is controlled by a first current source included in the first branch and the current flowing through the third branch of the second parallel circuitry is controlled by a second current source included in the third branch.

In another implementation of the fifth aspect, the method further comprises: in response to the input, sending, from the A/V doorbell to a doorbell adapter device coupled to the digital signaling device, a signal to supply power to the digital signaling device.

In another implementation of the fifth aspect, the signal is sent to a switch included in the doorbell adapter device and the switch is configured to divert power to the digital signaling device from the A/V doorbell.

In a sixth aspect, a method performed by an audio/video (A/V) recording and communication doorbell device ("A/V doorbell") coupled to doorbell power circuitry having a power source, the method comprises: receiving a first input voltage from the power source to supply power to one or more functional components of the A/V doorbell; receiving, via an input device of the A/V doorbell, an input to cause a signaling device coupled to the A/V doorbell to activate; receiving, based at least partly on the input, a second input voltage from the power source, the second input voltage being less than the first input voltage; and supplying, based at least partly on the second input voltage, at least a threshold amount of power to one or more functional components of the A/V doorbell.

In an implementation of the sixth aspect, the A/V doorbell is included in parallel circuitry having a first branch including shunting circuitry and a second branch including the A/V doorbell; and decreasing the first input voltage from the power source to the second input voltage includes increasing an amount of current flowing through the first branch of the parallel circuitry.

In another implementation of the sixth aspect, the method further comprises activating boost converter circuitry of the A/V doorbell to supply at least the threshold amount of power to the one or more functional components.

In another implementation of the sixth aspect, the method further comprises after a period of time of activation of the signaling device, receiving a third input voltage from the power source, the third input voltage corresponding to the first input voltage.

In a seventh aspect, a method performed by a doorbell adapter device coupled to a signaling device and to doorbell power circuitry, the doorbell power circuitry having a power source and the method comprises: receiving a signal to operate a switch to supply power to the signaling device from the power source; modifying, based at least partly on the signal, current flowing through parallel circuitry coupled to the signaling device, the parallel circuitry having a first branch including shunting circuitry and a second branch including signaling device control circuitry coupled to the signaling device; and supplying at least a threshold amount of power to the signaling device.

In an implementation of the seventh aspect, the doorbell adapter device includes a current sensor coupled to the parallel circuitry and the shunting circuitry includes a current source, and the method further comprises: detecting, by the current sensor, at least a threshold amount of current; and sending a signal to the current source to decrease an amount of current flowing through the first branch.

In another implementation of the seventh aspect, supplying at least a threshold amount of power to the signaling device includes activating boost converter circuitry of the signaling device control circuitry.

In another implementation of the seventh aspect, the signaling device includes a digital signaling device and modifying the current flowing through the parallel circuitry includes increasing the amount of current flowing through the first branch of the parallel circuitry.

In another implementation of the seventh aspect, after the signaling device has produced sound for a period of time, the method further comprises: operating the switch to divert power away from the signaling device; and decreasing a power supplied to the signaling device via the power source.

What is claimed is:

1. A doorbell adapter device having first and second terminals for coupling to a signaling device in doorbell power circuitry having a power source, the signaling device producing sound when activated, the doorbell adapter device comprising:
   a parallel circuit including a first branch having a current source and a second branch having signaling device control circuitry that is coupled to the signaling device;
   a current sensor coupled to the parallel circuit for detecting a first amount of current flowing out of the parallel circuit; and
   current source control circuitry that sends a control signal to the current source to cause the current source to modify a second amount of current drawn by the current source based at least in part on the first amount of current.

2. The doorbell adapter device of claim 1, further comprising signaling device control circuitry coupled to the signaling device, wherein the signaling device control circuitry includes a boost-buck converter that supplies power to the signaling device based at least partly on an applied voltage across the parallel circuit.

3. The doorbell adapter device of claim 1, further comprising signaling device control circuitry coupled to the signaling device, wherein the signaling device control circuitry includes H-bridge circuitry coupled to clock circuitry, and the H-bridge circuitry supplies a direct current (DC) signal to the signaling device for a first period of time and an alternating current (AC) signal to the signaling device for a second period of time subsequent to the first period of time.

4. The doorbell adapter device of claim 1, wherein:
   the current source control circuitry includes an operational amplifier;
   the current source is a metal-oxide semiconductor field-effect transistor (MOSFET); and
   the control signal is sent by the operational amplifier to a gate of the MOSFET.

5. The doorbell adapter device of claim 1, wherein a power requirement for the signaling device to produce sound is from 2 W to 20 W.

6. The doorbell adapter device of claim 1, wherein the signaling device control circuitry includes one or more supercapacitors that supply power to the signaling device.

7. The doorbell adapter device of claim 1, further comprising pulse width modulation (PWM) circuitry coupled to the current source.

8. The doorbell adapter device of claim 1, wherein, when the signaling device includes a mechanical signaling device:
   the current sensor detects that the first amount of current is at least a threshold amount of current;
   the current source receives the control signal from the current source control circuitry and decreases a third amount of current in the first branch of the parallel circuit; and
   the signaling device control circuitry increases a voltage applied to the mechanical signaling device.

9. The doorbell adapter device of claim 1, wherein, when the signaling device includes a digital signaling device:
   a voltage applied to the digital signaling device is no greater than a threshold voltage; and
   the current source increases a third amount of current drawn by the current source.

10. The doorbell adapter device of claim 1, wherein after the signaling device has produced sound for a period of time:
    the current sensor detects that a third amount of current related to the parallel circuit is less than a threshold current;
    the current source increases current drawn by the current source from the third amount of current to the first amount of current; and
    the parallel circuit decreases the power available to the signaling device.

11. A doorbell adapter device having first and second terminals for coupling to a signaling device that produces sound and for coupling to doorbell power circuitry having a power source, the doorbell adapter device comprising:
    a current source configured to draw a first amount of current from the power source;
    signaling device control circuitry in parallel with the current source creating a parallel circuit, the signaling device control circuitry configured to supply power to the signaling device to cause the signaling device to produce the sound;
    a current sensor coupled to the parallel circuit and configured to detect a second amount of current flowing from the parallel circuit; and
    current source control circuitry coupled between the current source and the current sensor.

12. The doorbell adapter device of claim 11, wherein the current source control circuitry is configured to send a control signal to the current source to cause the current source to modify the first amount of current based at least in part on the second amount of current.

13. The doorbell adapter device of claim 11, wherein the signaling device control circuitry includes a boost-buck converter that supplies the power to the signaling device based at least partly on an applied voltage across the parallel circuit.

14. The doorbell adapter device of claim 11, wherein the signaling device control circuitry includes H-bridge circuitry coupled to clock circuitry, and the H-bridge circuitry supplies a direct current (DC) signal to the signaling device for a first period of time and an alternating current (AC) signal to the signaling device for a second period of time subsequent to the first period of time.

15. The doorbell adapter device of claim 11, wherein:
the current source control circuitry includes an operational amplifier; and
the current source is a metal-oxide semiconductor field-effect transistor (MOSFET).

16. The doorbell adapter device of claim 11, wherein a power requirement for the signaling device to produce sound is from 2 W to 20 W.

17. The doorbell adapter device of claim 11, wherein the signaling device control circuitry includes one or more supercapacitors that supply power to the signaling device.

18. The doorbell adapter device of claim 11, further comprising pulse width modulation (PWM) circuitry coupled to the current source.

19. The doorbell adapter device of claim 11, wherein, when the signaling device includes a mechanical signaling device:
the current sensor detects that the first amount of current is at least a threshold amount of current;
the current source receives a control signal from the current source control circuitry and decreases a third amount of current in a branch of the parallel circuit; and
the signaling device control circuitry increases a voltage applied to the mechanical signaling device.

20. The doorbell adapter device of claim 11, wherein, when the signaling device includes a digital signaling device:
a voltage applied to the digital signaling device is no greater than a threshold voltage; and
the current source increases a third amount of current drawn by the current source.

* * * * *